United States Patent
Hou et al.

(10) Patent No.: US 10,416,871 B2
(45) Date of Patent: Sep. 17, 2019

(54) DIRECT MANIPULATION INTERFACE FOR DATA ANALYSIS

(71) Applicant: Microsoft Technology Licensing, LLC., Redmond, WA (US)

(72) Inventors: Zhitao Hou, Beijing (CN); Haidong Zhang, Beijing (CN); Bryan Dove, Seattle, WA (US); Dongmei Zhang, Beijing (CN); Xiao Liang, Beijing (CN); He Huang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 14/201,368

(22) Filed: Mar. 7, 2014

(65) Prior Publication Data
US 2015/0254369 A1   Sep. 10, 2015

(51) Int. Cl.
| G06F 3/048 | (2013.01) |
| G06F 3/0486 | (2013.01) |
| G06F 16/904 | (2019.01) |
| G06F 16/248 | (2019.01) |
| G06F 3/0481 | (2013.01) |
| G06F 3/0488 | (2013.01) |

(52) U.S. Cl.
CPC .......... *G06F 3/0486* (2013.01); *G06F 3/0481* (2013.01); *G06F 3/04883* (2013.01); *G06F 16/248* (2019.01); *G06F 16/904* (2019.01)

(58) Field of Classification Search
None
See application file for complete search history.

(56) References Cited

U.S. PATENT DOCUMENTS

| 5,535,324 | A | 7/1996 | Alvarez et al. |
| 6,529,217 | B1 | 3/2003 | Maguire, III et al. |
| 6,768,997 | B2 | 7/2004 | Schirmer et al. |
| 6,906,717 | B2 | 6/2005 | Couckuyt et al. |
| 7,149,983 | B1 | 12/2006 | Robertson et al. |
| 7,461,052 | B2 | 12/2008 | Dettinger et al. |
| 7,738,032 | B2 | 6/2010 | Kollias et al. |

(Continued)

FOREIGN PATENT DOCUMENTS

| CN | 1523481 | 8/2004 |
| EP | 0172368 | 2/1986 |
| EP | 2423797 | 2/2012 |

OTHER PUBLICATIONS

Office Action for U.S. Appl. No. 13/589,999, dated Feb. 27, 2015, Zhitao Hou, "Data Exploration User Interface", 22 pages.

(Continued)

*Primary Examiner* — Linh K Pham

(57) ABSTRACT

Implementations are described related to users directly manipulating visual depictions of aspects of a data set displayed in a user interface to generate or modify visual representations of the data set, such as a chart. The direct manipulation may be either through a computer input device, (e.g., a keyboard or mouse), or based on other input data, such as a touch input. Aspects of a data set include dimensions, which may be used to filter the data set, and metrics, which are quantifiable elements within the data set. In various implementations, input such as drag-and-drop operations corresponding to visual depictions of aspects of a data set may be interpreted in generating or modifying charts.

20 Claims, 15 Drawing Sheets

(56) References Cited

U.S. PATENT DOCUMENTS

| | | | |
|---|---|---|---|
| 7,783,678 B2 | 8/2010 | Kim | |
| 7,861,310 B2* | 12/2010 | Krane | G06F 3/0482 709/203 |
| 8,269,773 B2 | 9/2012 | Gregg, III | |
| 8,326,852 B2 | 12/2012 | Dettinger et al. | |
| 8,527,909 B1* | 9/2013 | Mullany | G06F 3/0484 345/173 |
| 8,583,631 B1* | 11/2013 | Ganapathi | G06F 16/2425 707/722 |
| 2002/0070953 A1 | 6/2002 | Barg et al. | |
| 2002/0073115 A1* | 6/2002 | Davis | G06F 16/9558 |
| 2002/0163547 A1 | 11/2002 | Abramson et al. | |
| 2003/0071814 A1 | 4/2003 | Jou et al. | |
| 2004/0032420 A1* | 2/2004 | Allen | G06Q 10/10 715/700 |
| 2004/0056899 A1 | 3/2004 | Sinclair, II et al. | |
| 2005/0165824 A1 | 7/2005 | Farnham et al. | |
| 2005/0234960 A1 | 10/2005 | Chickering et al. | |
| 2006/0178827 A1 | 8/2006 | Aoyama | |
| 2007/0005562 A1 | 1/2007 | Chau et al. | |
| 2007/0208992 A1* | 9/2007 | Koren | G06Q 10/10 715/212 |
| 2008/0066009 A1* | 3/2008 | Gardner | G06F 8/34 715/809 |
| 2008/0091668 A1 | 4/2008 | Dettinger et al. | |
| 2008/0192056 A1* | 8/2008 | Robertson | G06T 11/206 345/440 |
| 2008/0195649 A1* | 8/2008 | Lefebvre | G06F 16/252 |
| 2008/0222562 A1* | 9/2008 | Helfman | G06F 17/246 715/810 |
| 2008/0259041 A1 | 10/2008 | Blumenberg et al. | |
| 2009/0083340 A1 | 3/2009 | Baskaran et al. | |
| 2009/0096812 A1* | 4/2009 | Boixel | G06Q 10/00 345/646 |
| 2009/0182748 A1 | 7/2009 | Walker | |
| 2009/0327975 A1 | 12/2009 | Stedman | |
| 2010/0010980 A1 | 1/2010 | Dettinger et al. | |
| 2010/0050076 A1 | 2/2010 | Roth | |
| 2010/0079498 A1 | 4/2010 | Zaman et al. | |
| 2010/0082232 A1 | 4/2010 | Lee | |
| 2010/0156804 A1 | 6/2010 | Young | |
| 2010/0162146 A1* | 6/2010 | Winkler | G06Q 10/06 715/763 |
| 2010/0214299 A1 | 8/2010 | Robertson et al. | |
| 2010/0235771 A1 | 9/2010 | Gregg, III | |
| 2010/0257447 A1 | 10/2010 | Kim et al. | |
| 2010/0265200 A1 | 10/2010 | Cho et al. | |
| 2010/0268463 A1 | 10/2010 | Kurtti et al. | |
| 2010/0325166 A1 | 12/2010 | Rubin et al. | |
| 2011/0012856 A1 | 1/2011 | Maxwell et al. | |
| 2011/0012931 A1 | 1/2011 | Abe | |
| 2011/0029853 A1 | 2/2011 | Garrity et al. | |
| 2011/0115814 A1 | 5/2011 | Heimendinger et al. | |
| 2011/0164060 A1 | 7/2011 | Miyazawa et al. | |
| 2011/0178974 A1 | 7/2011 | Sayal et al. | |
| 2011/0225525 A1 | 9/2011 | Chasman et al. | |
| 2011/0283231 A1 | 11/2011 | Richstein et al. | |
| 2011/0289161 A1 | 11/2011 | Rankin, Jr. et al. | |
| 2012/0005228 A1 | 1/2012 | Singh | |
| 2012/0017165 A1* | 1/2012 | Gardner | G06F 17/30899 715/771 |
| 2012/0030566 A1 | 2/2012 | Victor | |
| 2012/0054226 A1 | 3/2012 | Cao et al. | |
| 2012/0166470 A1* | 6/2012 | Baumgaertel | G06Q 10/067 707/769 |
| 2012/0229466 A1* | 9/2012 | Riche | G06F 16/9038 345/440 |
| 2013/0044114 A1 | 2/2013 | Burtner et al. | |
| 2013/0151572 A1 | 6/2013 | Brocato et al. | |
| 2013/0185624 A1 | 7/2013 | Appleyard et al. | |
| 2013/0275904 A1* | 10/2013 | Bhaskaran | G06F 16/26 715/771 |
| 2014/0049557 A1 | 2/2014 | Hou et al. | |
| 2014/0053091 A1 | 2/2014 | Hou et al. | |
| 2014/0164285 A1* | 6/2014 | Ashburn | G06Q 10/067 705/36 R |
| 2014/0201682 A1* | 7/2014 | Lee | G06F 3/0481 715/846 |
| 2015/0033173 A1* | 1/2015 | Im | G06F 16/34 715/771 |

OTHER PUBLICATIONS

Office action for U.S. Appl. No. 13/589,958, dated Mar. 17, 2015, Hou et al., "User Interface Tools for Exploring Data Visualizations", 26 pages.

Bailey, et al., "From Records to Data with Viewshare: An Argument, An Interface, A Design", In Proceedings Bulletin of the American Society for Information Science & Technology, vol. 38 Issue 4, Apr. 2012, 4 pages.

"Reports Tour—Charting", Retrieved on: Sep. 27, 2013, Available at: http://www.zoho.com/reports/Charting-Data.html.

"Interactive Analysis for Business Information and Insights", In Proceedings of the White Paper, Jul. 19, 2012, 4 pages.

"Tour the Complete Business Data Environment", Published on: Oct. 3, 2012, Available at: http://chartio.com/product/tour.

Heer, Jeffrey Michael, "Supporting Asynchronous Collaboration for Interactive Visualization", In Proceedings of the Dissertation, Dec. 17, 2008, 209 pages.

"GeogXpert for Ipad", Published on: Aug. 29, 2011, Available at: http://www.alancsmith.co.uk/geogxpertipad/GeogXpertIPad_1.html.

International Search Report & Written Opinion for PCT Patent Application No. PCT/US2013/054809, dated Nov. 13, 2013, filed Aug. 13, 2013, 19 Pages.

Keim, et al., "Using Visualization to Support Data Mining of Large Existing Databases", In Proceedings of the IEEE Visualization Workshop on Database Issues for Data Visualization, Oct. 26, 1993, 20 Pages.

"MagicalPad Take Control of Your Notes", Retrieved on: Mar. 27, 2012, Available at: http://www.magicalpad.com/wp-content/uploads/2011/10/MagicalPad-User-Manual.pdf 34 pages.

Office Action for U.S. Appl. No. 13/589,999, dated Jul. 17, 2014, Zhitao Hou, "Data Exploration User Interface", 20 pages.

Office action for U.S. Appl. No. 13/589,958, dated Jul. 31, 2014, Hou et al., "User Interface Tools for Exploring Data Visualizations", 24 pages.

Song, et al., "WYSIWYF: Exploring and Annotating Volume Data with a Tangible Handheld Device", In Proceedings of the Annual Conference on Human Factors in Computing Systems, May 7, 2011, pp. 1333-1342.

European Office Action dated Oct. 29, 2015 for European Patent Application No. 13753943.3, a counterpart foreign application of U.S. Appl. No. 13/589,958, 13 pages.

Office action for U.S. Appl. No. 13/589,999, dated Oct. 22, 2015, Hou et al., "Data Exploration User Interface", 19 pages.

European Office Action dated Jun. 28, 2016 for European Patent Application No. 13753943.3, a counterpart foreign application of U.S. Appl. No. 13/589,958, 8 pages.

Final Office Action for U.S. Appl. No. 13/589,999, dated May 19, 2016, Zhitao Hou, "Data Exploration User Interface", 14 pages.

PCT International Preliminary Report on Patentability in PCT Application No. PCT/US2013/054809, dated Feb. 24, 2015, 15 Pages.

PCT International Preliminary Report on Patentability in PCT Application No. PCT/US2013/055225, dated Feb. 24, 2015, 7 Pages.

PCT International Search Report & Written Opinion for PCT Application No. PCT/US2013/055225, dated Oct. 22, 2013, filed Aug. 13, 2013, 10 Pages.

U.S. Appl. No. 13/589,958, Amendment and Response filed Nov. 26, 2014, 21 pgs.

U.S. Appl. No. 13/589,958, Appeal Brief filed Apr. 21, 2016, 9 pgs.

U.S. Appl. No. 13/589,958, Examiner's Answer to the Appeal Brief dated Oct. 24, 2016, 33 pgs.

U.S. Appl. No. 13/589,958, Reply Brief filed Dec. 27, 2016, 4 pgs.

(56) References Cited

OTHER PUBLICATIONS

U.S. Appl. No. 13/589,999, Advisory Action dated Jun. 29, 2015, 3 pgs.
U.S. Appl. No. 13/589,999, Amendment and Response filed Jan. 28, 2016, 26 pgs.
U.S. Appl. No. 13/589,999, Amendment and Response filed Nov. 13, 2014, 33 pgs.
U.S. Appl. No. 13/589,999, Amendment and Response filed Apr. 27, 2015, 33 pgs.
U.S. Appl. No. 13/589,999, Amendment and Response filed Jun. 24, 2016, 11 pgs.
U.S. Appl. No. 13/589,999, Notice of Allowance dated Sep. 23, 2016, 15 pgs.
U.S. Appl. No. 13/589,958, Amendment and Response filed Feb. 1, 2018, 9 pgs.
U.S. Appl. No. 13/589,958, Decision on Appeal dated Dec. 5, 2017, 14 pgs.
European Office Action in Application 13753943.3, dated Jul. 31, 2017, 7 pages.
Chinese Second Office Action in Application No. 201380044078.7, dated Jul. 19, 2017, 17 pages.
Chinese Third Office Action in Application No. 201380044078.7, dated Dec. 5, 2017, 17 pages.
Chinese Office Action dated Feb. 14, 2017 for Chinese Patent Application No. 201380044078.7, a counterpart foreign application of U.S. Appl. No. 13/589,958.

* cited by examiner

DIRECT MANIPULATION INTERFACE FOR DATA ANALYSIS

BACKGROUND

Manipulating data sets through different types of analysis in order to find meaningful information is often a difficult process. Traditional approaches allow users to specify criteria for filtering a data set and generating a chart through the selection of rows and columns of data. However, traditional methods for specifying the data to use to generate a chart tend to limit the data that may be included in the chart and are not intuitive or efficient.

SUMMARY

The techniques and systems described herein present various implementations of a direct manipulation interface component that allows users to analyze data by generating and modifying charts through direct manipulation of one or more visual depictions of a chart or of a data set. The direct manipulation may be either through traditional computer input devices or based on other input methods, such as gesture input.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
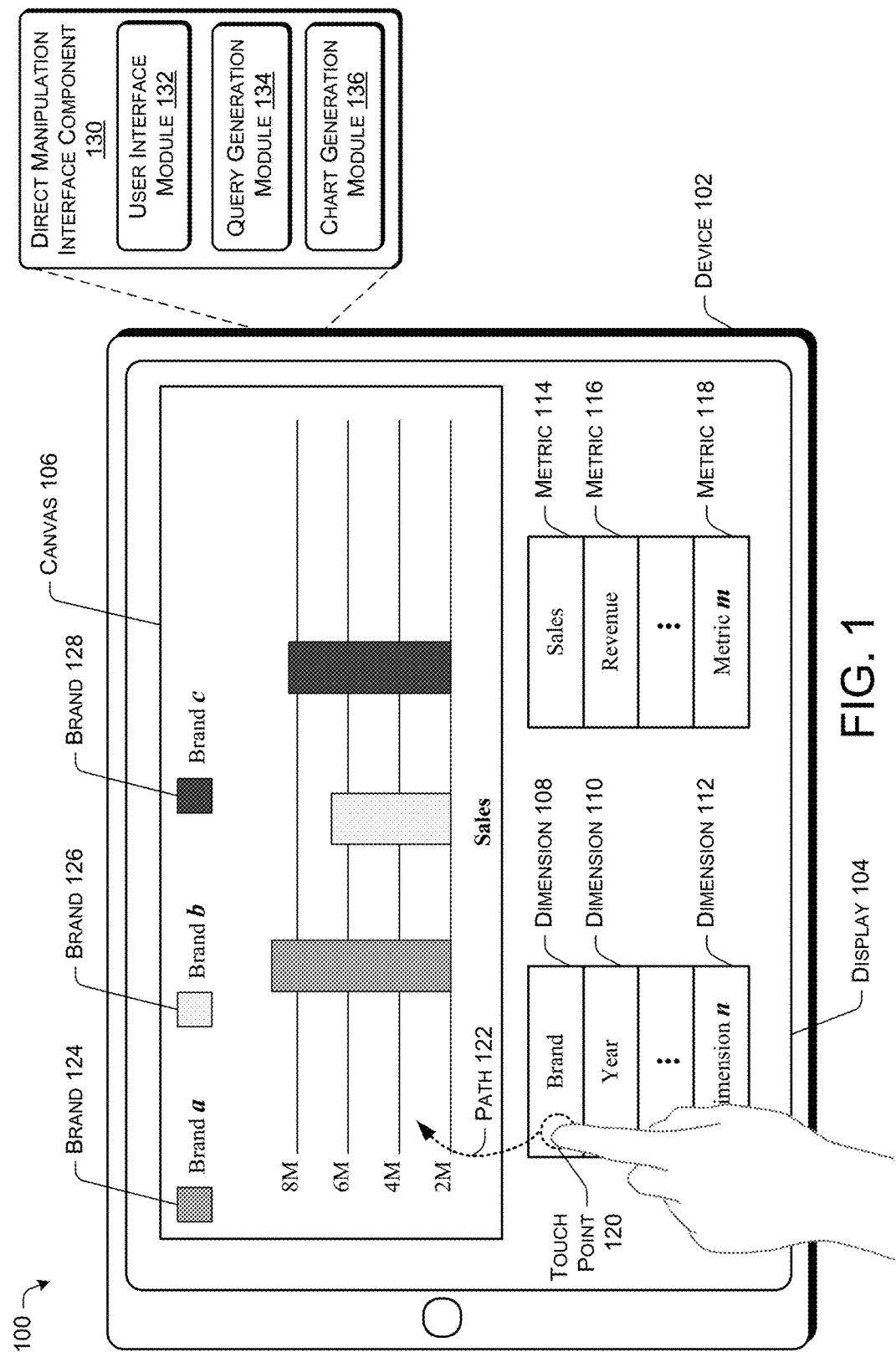
FIG. 1 illustrates an example device in which a direct manipulation interface component may be implemented.

The techniques and systems described herein are directed to various implementations of a direct manipulation interface component. A direct manipulation interface component may provide a variety of ways for directly modifying various elements of a chart. Further, to generate a chart or graph, a direct manipulation interface component may allow for directly selecting visual depictions of a data set to include in the chart to be generated. In this way, the direct manipulation interface component may be used in place of a control panel for generating queries for data.

Further, representations of the data set, such as a chart, may include elements that themselves may be manipulated. For example, a bar in a bar chart or a slice of a pie chart may be directly selected and dragged-and-dropped to perform a modification. In some implementations, a user may select an element of one chart and drag the selected element onto a different chart, resulting in modifications to both charts. However, in other cases, a result of the selection and drag of an element from one chart into another is not a modification to both charts, but rather a modification of the chart onto which the selected element is dragged. In other implementations, a user may select an element of one chart and drag the selected element onto a blank area of a canvas to both generate a new chart based on the selected element and to also modify the chart from which the element was selected and dragged from.

As one example, a direct manipulation interface component may generate a user interface window within which a user may select one or more elements of a data set to generate or modify a chart. For example, for a multidimensional data set, a group of data items may be called a data segment or data cohort, and a data segment or data cohort may be specified as filters upon one or more dimensions. A dimension may be a field of the data set and a dimension item may be a specific instance of the dimension. For example, in a data set of demographic data, a dimension may be cities and a dimension item may be a specific city name. In different cases, multiple data cohorts may be compared through calculation of statistical summarization of measures or metrics for the multiple data cohorts. A measure or metric may be a data value representing a quantifiable measure. For example, in the data set of demographic data, a metric may be population, ages, income levels, or other types of measurable data.

In some implementations, a tuple may be used to represent a data cohort, where each tuple may represent a Dimension:ValueSet pair denoting a filter on a given dimension. For example, (Dimension1:ValueSet1, Dimension2: ValueSet2, . . . , DimensionN:ValuesetN). Further, in this example, a selection of data items that belong to this data cohort may be based on the following predicate: ((Dimension1 in ValueSet1) AND (Dimension2 in ValueSet2) AND . . . AND (DimensionN in ValueSetN)).

For example, a data set may be representative of automotive sales, where yearly sales are recorded in different countries, and where sales may be broken down according to brand and category. In this example, the data set may include four dimensions, "Year," "Brand," "Category" and "Country," and one metric, "Sales." In other examples, another dimension may serve as a filter to narrow the data set, such as "Engine," "Transmission," and so forth. Further, in this example data set, other metrics may be revenue, profit, or some other values that may be representative of quantitative aspects of the data set. Example data cohorts may be: (Brand: {"Ford"}), which would narrow the data set down to Ford automobiles; (Brand: {"Ford", "Honda"}), which would narrow the data set down to Ford and Honda automobiles; and (Brand: {"Honda"}, Category: {"SUV"}, Country: {"China"}), which would narrow the data set down to Honda SUVs sold in China.

In some implementations, dimensions of a data set used to specify a data cohort may be considered a dimension set of a data cohort. For example, a dimension set of (Brand: {"Honda"}, Category: {"SUV"}, Country: {"China"}) would be the dimension set {Brand, Category, Country}. In some cases, two or more data cohorts may be considered homogeneous if they have the same dimension set, otherwise, if two data cohorts have different dimension sets they may be considered heterogeneous. For example, data cohorts (Brand: {"Honda"}, Category: {"SUV"}, Country: {"China"}); (Brand: {"Honda"}, Category: {"midsize"}, Country: {"US"}); and (Brand: {"Ford"}, Category: {"SUV"}, Country: {"China"}) may be considered homogeneous because the data cohorts include the same dimensions even though the different data cohorts would filter a data set differently due to the differing dimension items for at least one of the dimensions. However, in another example, data cohorts (Brand: {"Honda"}) and (Brand: {"Ford"}, Category: {"SUV"}, Country: {"China"}) may be considered heterogeneous because the data cohorts include different dimensions.

In some implementations, a direct manipulation interface component may allow a user to select a data set dimension, a data cohort, and/or a metric to be made using a mouse to point, click, and drag a visual depiction of one or more aspects of a data set into a canvas. In other cases, a selection of one or more dimensions, data cohorts, and/or metrics of a data set may be made using a touch input, such as a gesture, to touch down, drag, and release a visual depiction of one or more aspects of the data set. In still other situations, voice input may be used to select one or more dimensions, data cohorts, and/or metrics of a data set and move the data set within a canvas. In various implementations, direct manipulation of visual depictions of aspects of a data set to generate or modify a chart provide a user with an intuitive and efficient way to analyze one or more data sets. In other words, without a user specifying row and column parameters of a data set query, a user may generate a chart or graph for analyzing a data set using direct manipulation of user interface elements. Such analysis allows a user to define simple or complex data cohorts, modify data cohorts dynamically by allowing removal or addition of elements of a chart that correspond to a dimension or dimension item of the chart, and compare data included in different data cohorts, whether the data cohorts being compared are homogeneous or heterogeneous.

FIG. 1 illustrates an example framework 100 in which a direct manipulation interface component may be implemented. In this example, device 102 includes a display 104 that is displaying an example user interface incorporating features provided by a direct manipulation interface component. In this example, the user interface includes a region where a chart may be generated or modified, referred to in this example as a canvas, such as canvas 106. In this example, display 104 includes a touch-sensitive display.

Further, in this implementation, visual representations of aspects of a data set are displayed within the user interface in the form of selectable dimensions and selectable metrics. For example, with respect to a data set with data for automobile sales, dimensions for an automobile brand and a year are displayed, where the dimension for the automobile brand is dimension 108, and where the dimension for the year is dimension 110. As further depicted in FIG. 1, other dimensions of the data set may be displayed, and in this example, n dimensions are displayed, as depicted with dimension 112. In this example, metric 114, metric 116, and metric 118 represent, respectively, automobile sales, automobile revenue, and an mth metric of the data set.

In this example, the chart displayed within canvas 106 is a chart generated as a result of a user interface action including a gesture that begins at touch point 120, continues along path 122, and ends within canvas 106. In response to this gesture, canvas 106 would go from blank to displaying sales metrics for the different brands of car in the data set. Further, in this example, the chart is generated in response to the user dragging in one dimension into the canvas area because a default metric was selected, in this case, metric 114 corresponding to automobile sales. In different examples, a different one or more metrics may be used, or specified by a user prior to generation of a chart. In some cases, the metric used to generate the chart may be specified using the user interface shown in the display 104. For example, the user may drag a visual representation of the metric to a specified portion of the user interface. In other instances, the metric used to generate the chart may be specified in one or more additional user interfaces. To illustrate, the user may specify the default metric using one or more menus that include a number of selectable options for default metrics.

As depicted in canvas 106, a chart includes sales metrics for the brands of automobiles in the data set, in this example, brands a, b, and c, corresponding to, respectively, brand 124, brand 126, and brand 128. In other examples, a data set may have more brands, or a user-specified default number of brands may be automatically selected for inclusion within a generated chart before the chart is generated.

Given the generated chart within canvas 106, a user may proceed to add or remove dimensions or metrics through the direct manipulation of user interface elements as described with respect to the initial generation of the chart. In this way, a user may manipulate visual representations of the dimensions and/or metrics to modify the data shown by the chart. For example, a user may select and move a brand off of the canvas 106 to remove the data associated with the brand from the chart.

In this example, device 102 may implement a direct manipulation interface component such as direct manipulation interface component 130, which may include user interface module 132, a query generation module 134, and a chart generation module 136. With respect to the above example, the direct manipulation interface component 130 may, in some cases, invoke the user interface module 132 to directly render and detect user inputs. In other situations, the user interface module 132 may interact with another layer of an operating system to receive input directed to generating or modifying the chart and rendering and displaying the chart based on the input. Further, direct manipulation interface component 130 may invoke query generation module 134 to interpret user inputs corresponding to direct manipulations of depicted aspects of a data set. Based on the interpreted input, the query generation module 134 may generate a query to an appropriate data set or data sets. In some cases, generation of the query may include determining any algebraic operations to be performed with regard to dimensions, dimension items, and metrics, and may also include determining query parameters. In different cases, a data set or data sets may be queried from a local source or from a remote source such as a database, or some combination of local and remote sources, to obtain the results of the queries generated by the query generation module 134.

Further still, direct manipulation interface component 130 may invoke a chart generation module 136 for determining a type of chart to use and for generating the visual elements to be included in the chart. For example, the chart generation module 136 may receive input indicating that a bar chart is to be generated. The chart generation module 136 may generate charts using data obtained as a result of a query produced by the query generation module 134. To illustrate, the chart generation module 136 may obtain data that is produced as a result of a query generated by the query generation module 134 and use the data to generate a particular type of chart, such as a bar chart or pie chart, that corresponds to the data.

Figure 2:
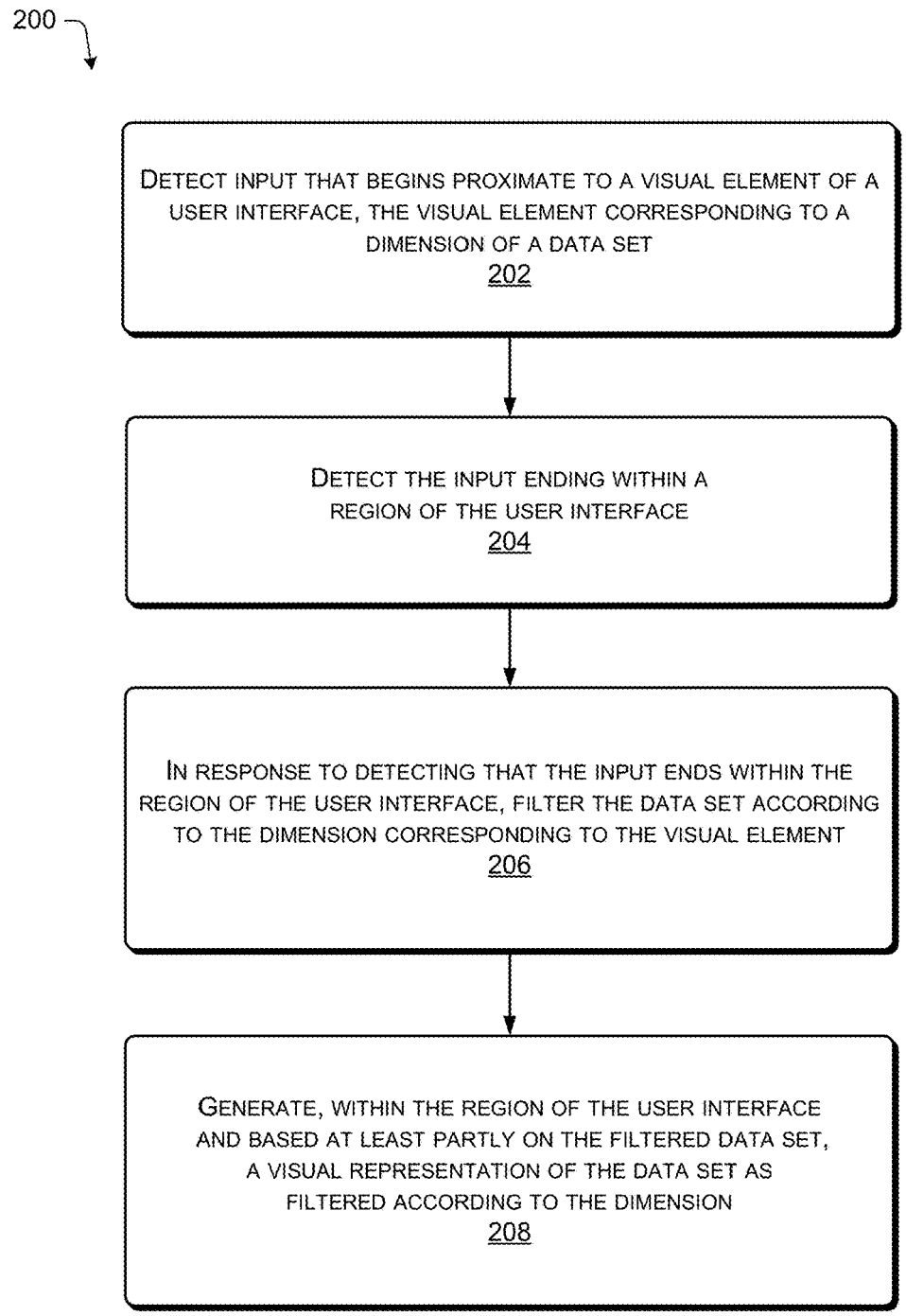
FIG. 2 is a flow diagram depicting a method to generate a chart using direct manipulations of visual depictions of a data set in accordance with some implementations.

FIG. 2 illustrates a flowchart 200 that includes representative operations performed by a direct manipulation interface component, such as the direct manipulation interface component 134 of FIG. 1, in generating a chart. In the flow diagram of FIG. 2, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

As described above with respect to FIG. 1, within the context of a user interface displayed on a device, a direct manipulation interface component may detect input that begins proximate to a visual element of the user interface, as depicted at 202. In this example, the visual element corresponds to a dimension of a data set. In different implementations, the direct manipulation interface component may, instead of detecting the input to the user interface, be implemented at a lower software layer and be notified of input detection. In other words, input detection may refer to either the direct manipulation interface component directly detecting the user interface input or the direct manipulation interface component receiving notification of input detection from another software layer through, for example, an application programming interface. Further, the input may be a gesture or the input may be from a mouse or keyboard or from some other input mechanism. In this example, the visual element may be an icon, a button, or some other visual depiction of a dimension or metric of a data set.

After the input that begins proximate to a visual element of a user interface is detected, the direct manipulation interface component may detect that the input has ended within a region of the user interface, as depicted at 204. For example, the input may end within a canvas region of the user interface as discussed above with respect to FIG. 1. In this example, in response to detecting that the input ends within the region of the user interface, the direct manipulation interface component may filter the data set, as depicted at 206. In this example, the data set may be filtered according to the dimension corresponding to the selected visual element and broken down according to dimension items. For example, in this example, a break down of the data provides not simply a total metric for a given dimension, but respective metrics for respective individual brands or dimension items, and these respective metrics may serve as a basis for the generation of the three bar graph depictions in the graph of FIG. 1. After the data set has been filtered, the direct manipulation interface component may generate a visual representation of the data set as filtered according to the dimension, as depicted at 208. In this example, the visual representation of the data set is generated within the region of the user interface where the detected input ended and the generated visual representation of the data set may be based at least in part on the filtered data set. As discussed above with respect to FIG. 1, the generated visual representation may be a chart generated within the canvas region of the user interface.

Further, while the direct manipulation interface component may allow a user to directly manipulate visual depictions of aspects of a data set to generate or modify charts, the direct manipulation interface component may still generate queries to a data set to retrieve the information from which a chart is to be generated or modified. For example, with respect to FIG. 1, in response to the user interface interaction of dragging and dropping dimension 108 into canvas 106, the direct manipulation interface component may create data cohorts (Brand: {"Brand a"}), (Brand: {"Brand b"}) and (Brand: {"Brand c"}), and these data cohorts may serve as a basis for querying the data set.

Further, in modifying the chart, the direct manipulation interface component may also perform algebraic operations to generate a query to the data set. For example, if the user were to select and drag dimension 110 corresponding to the "Year" dimension into canvas 106, the direct manipulation interface component would, in response, generate updated data cohorts, and determine the algebraic operations for generating a query corresponding to the updated data cohorts. In this example, the query results would then serve as a basis for generating an updated chart. After the direct manipulation interface component has received query results, the direct manipulation interface component may then determine an appropriate format for generating the chart based on different criteria, including user preferences, numbers of dimensions, numbers of metrics, and visual clarity of a rendered chart.

Figure 3:
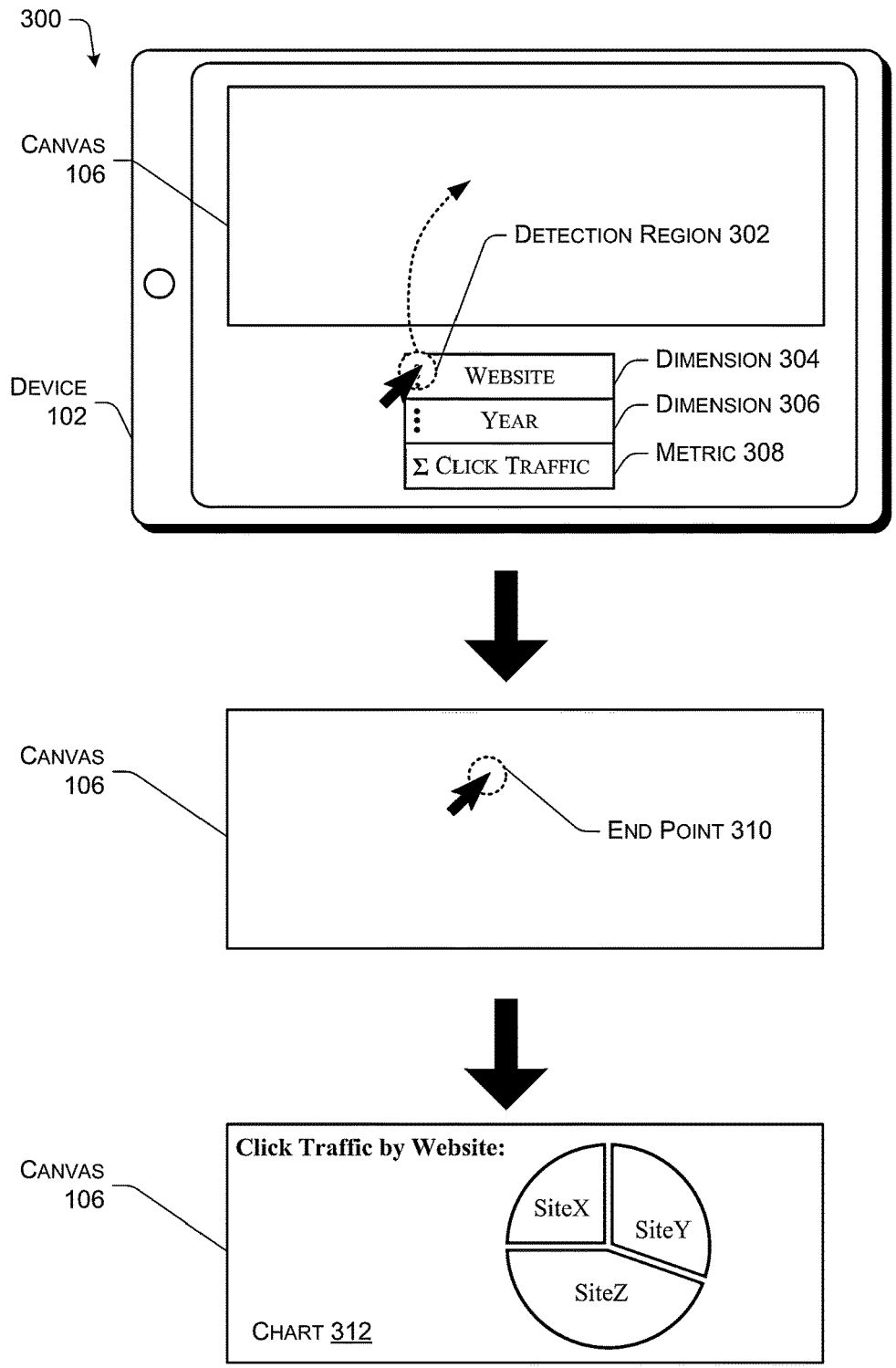
FIG. 3 depicts an example of direct manipulation within a user interface for generating a chart in accordance with some implementations.

FIG. 3 illustrates a framework 300 depicting an example of the direct manipulation interface component generating a chart from a data set based on direct user manipulations of representations of aspects of a data set. In this example, similar to FIG. 1, a user may begin a user interface input within detection region 302 of a user interface, which corresponds to dimension 304. In this example, dimension 304 corresponds to a website, and the data set being queried to generate a chart may include web analytics data collected by a web server or analytics server for multiple websites. In this example data set, dimensions may also exist for a year, depicted by dimension 306, and a metric for click traffic, depicted by metric 308. Other dimensions and metrics may also be included within a web analytics data set, and these few examples are used for descriptive purposes.

In this example, the user interface input may be a mouse click and drag. Further, in this example, the detection region 302 may be indicated to a user with a graphical element, in this case, three vertically placed dots. For example, the three vertically placed dots may signify a dimension and a sigma ("Σ") may signify a metric. However, in different implementations, the entire area within which the aspect of the data set is presented may be selectable for direct manipulation, and other graphical elements may represent dimensions or metrics.

When the user interface input, which began within detection region 302 ends within the canvas 106 at end point 310, the direct manipulation interface component, in response, may generate a chart 312 corresponding to the data set as filtered or grouped according to the dragged dimension. In this case, the direct manipulation interface component may use a default metric such as click traffic, but in other examples one or more other default metrics may be used. In this example, the generated chart, chart 312 may be generated as a pie chart. However, in other examples, the direct manipulation interface component may determine that a different type of chart may be appropriate for clearly conveying the chart contents.

Figure 4:
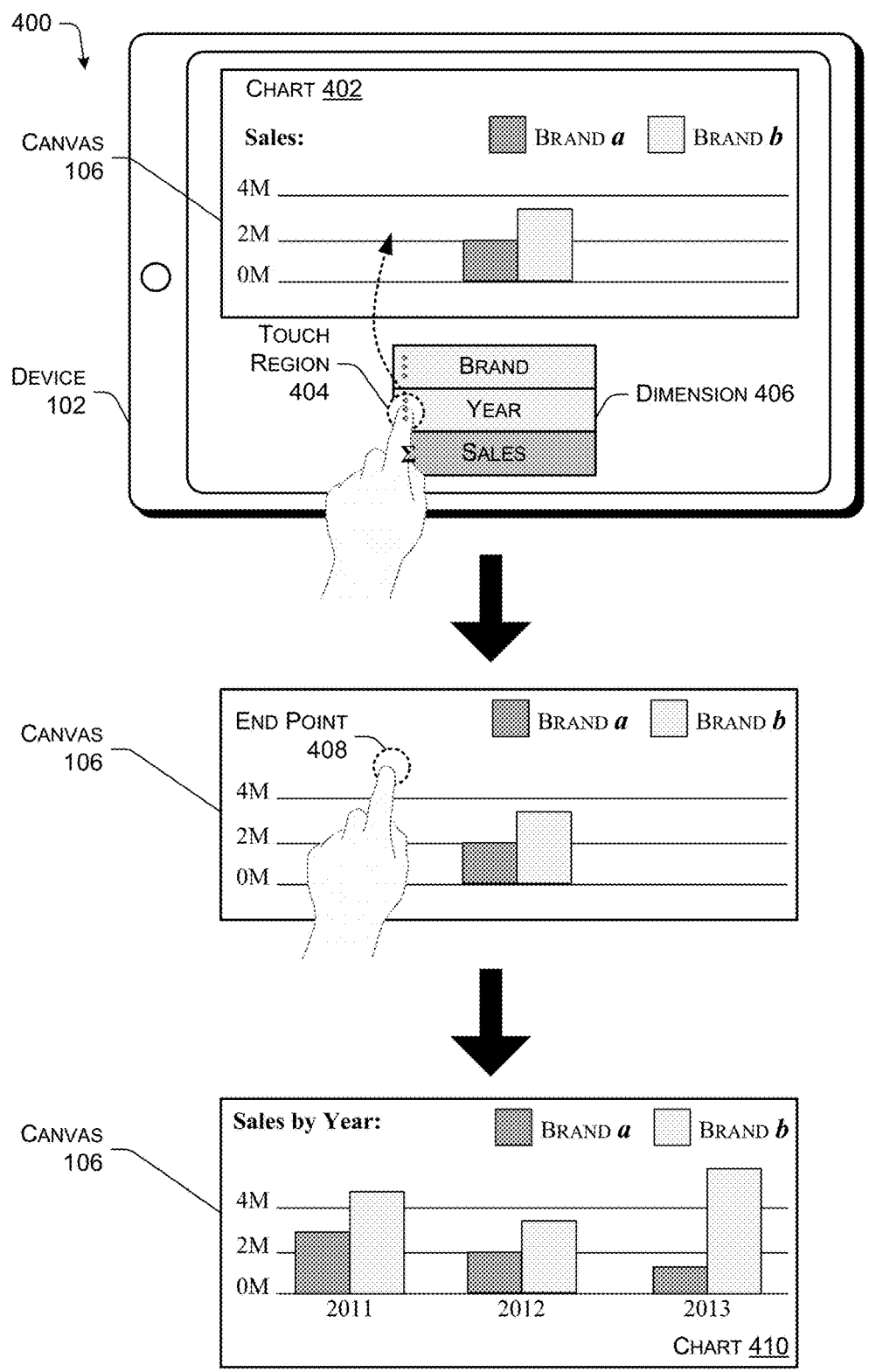
FIG. 4 depicts an example of direct manipulation within a user interface for modifying a chart by selecting dimension items to add to a chart in accordance with some implementations.

FIG. 4 illustrates a framework 400 depicting an example of the direct manipulation interface component modifying a chart, where the modifications are based on direct user manipulations of representations of aspects of a data set. In this example, a user has already generated a chart, as depicted with chart 402 within canvas 106, where chart 402 depicts sales amounts for two brands, Brand a and Brand b. In this example, sales for each brand are depicted with bars. Given this existing chart 402, a user may begin a gesture at touch region 404, which corresponds to dimension 406, a dimension of the data set corresponding to a yearly breakdown of a given metric, such as sales in this instance.

In this example, in response to the user dragging from touch region 404 to end point 408, the direct manipulation interface component modifies existing chart 402. As depicted with chart 410, a result of the user adding a year dimension to existing chart 402 is that, for Brand a and Brand b, additional data set information is included in the form of yearly breakdown. In this case, instead of two bars for sales for Brand a and Brand b as depicted in chart 402 for a single year, the direct manipulation interface component modifies chart 402 to includes sales information for Brand a and Brand b over multiple years, 2011, 2012 and 2013. In this example, a default of three previous years is determined, however, other default values may be specified, and the user may also add additional years or remove years once chart 410 is generated.

Figure 5:
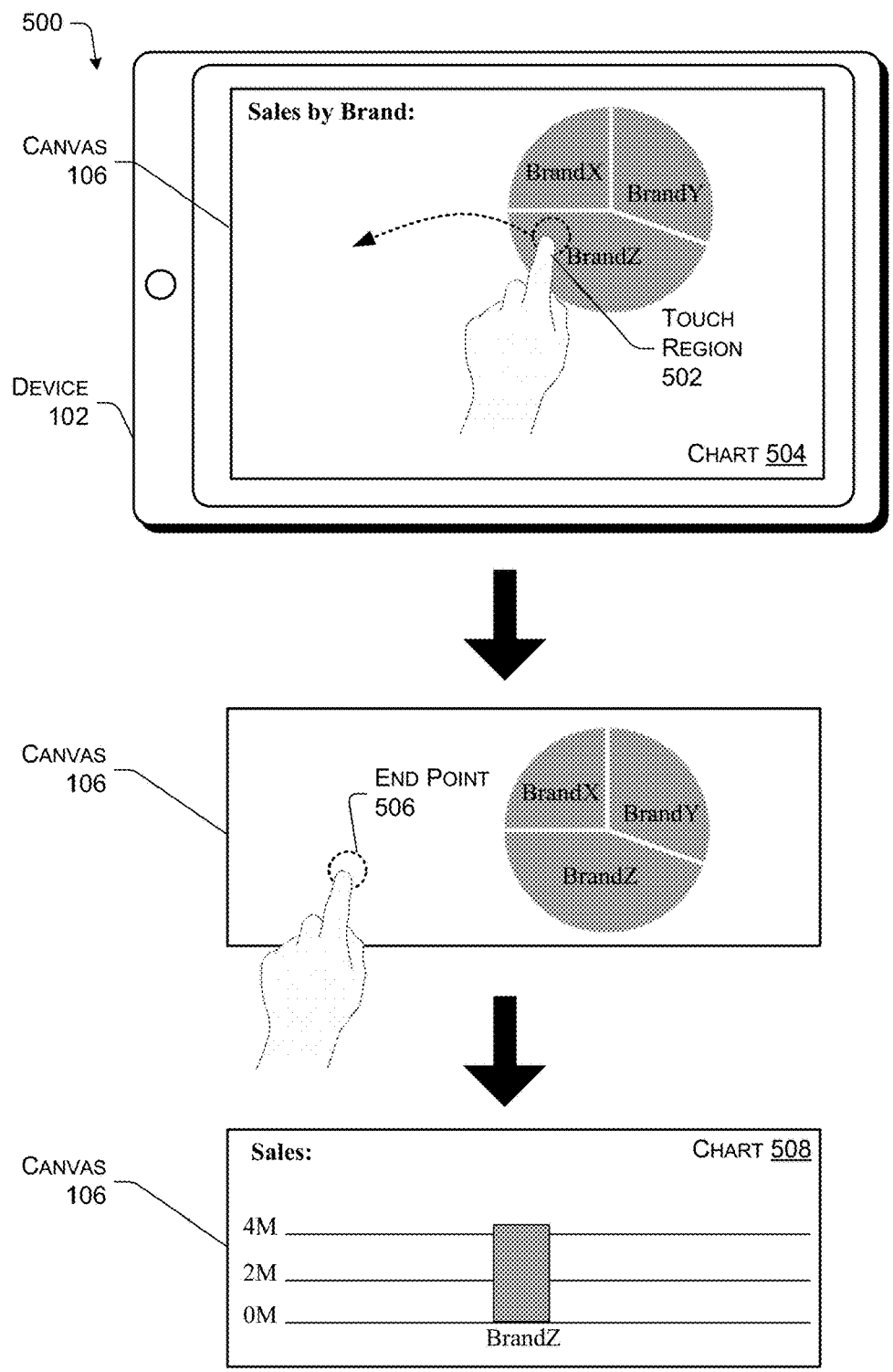
FIG. 5 depicts an example of direct manipulation within a user interface for isolating a dimension item in accordance with some implementations.

FIG. 5 illustrates a framework 500 depicting an example of the direct manipulation interface component modifying a chart, where the modifications are based on direct user manipulations of representations of aspects of a data set. In this example, the user may select a slice of a pie chart by touching down within touch region 502 of chart 504. Further, in this example, touch region 502 corresponds to BrandZ, which is one of the three brands within the brand dimension of the data set corresponding to chart 504.

Further, in response to the direct manipulation interface component detecting that the drag-and-drop gesture ends at end point 506, the direct manipulation interface component may generate a new chart, chart 508. In this example, chart 508 includes the single brand, BrandZ, and depicts sales for BrandZ. In this manner, the user is able to focus on and isolate a single dimension item, in this case a specific brand name, and generate a new chart that focuses on the specific brand name. Further, in this example, in order to emphasize focus on the newly created chart 508, pie chart 504 is no longer displayed. However, in different examples, other results of the drag-and-drop may be: (a) two charts may be displayed in the canvas, one chart as depicted by chart 508 and another chart, the pie chart 504 modified to no longer include BrandZ and remain with two brand names, (b) chart 508 may be created and pie chart 504 may remain unmodified with the same three brands, or (c) a modified or unmodified pie chart 504 may remain with respect to the included brands depicted, however, the pie chart may be transformed to a different type of chart, for example, a chart of the same type as the newly created chart. Further, based on chart selection criteria, the direct manipulation interface component may generate similar type charts or different charts, such as a bar chart and pie chart. Further, in this example, the other aspects defining the original chart, chart 504, are maintained. This allows a user to quickly and fluidly create new charts that vary a single parameter, whether a dimension or a metric.

In other implementations, a user may use other gestures to modify an existing chart. For example, a user may touch down in two different regions at about the same time, such as touch region 502 corresponding to dimension item BrandZ and another region corresponding to another dimension item, such as BrandY. In situations where multiple regions associated with the chart 504 are touched within a threshold amount of time, such as no greater than 1 second, no greater than 0.5 seconds, no greater than 0.1 seconds, or no greater than 0.05 seconds, the manipulation of the multiple regions may become associated with each other. For example, while maintaining the touch input over both dimension items, a user may drag both dimension items out of the pie chart, similar to the above described example where a user drags a single dimension item out of the pie chart. In this case, chart 508, instead of displaying a single bar for BrandZ, would additionally include a bar for BrandY, based on the drag-and-drop of the multiple dimension items. This example may be extended to selections of dimension items, or metrics, or combinations of dimension items and metrics that occur within a threshold amount of time with respect to each other. Further, given multiple charts, a user may select a depicted aspect of a first chart and a depicted aspect of a second chart within a threshold amount of time, and then drag all selected aspects of the different charts into a region of the canvas 106 to produce an additional chart.

In other examples, a user may touch down within a region corresponding to an aspect of the data set, such as a dimension item, and remove the dimension item to leave a modified chart that does not include the dimension item. For example, if the user were to touch down within touch region 502 of chart 504, and instead of dragging-and-dropping within the canvas as described above, the user flicked the dimension item or dragged the dimension item outside of the canvas 106, then the direct manipulation interface component may generate a new chart without the flicked-away or dragged-away dimension item. This example may also be extended to simultaneous selections and removal of multiple dimension items.

Figure 6:
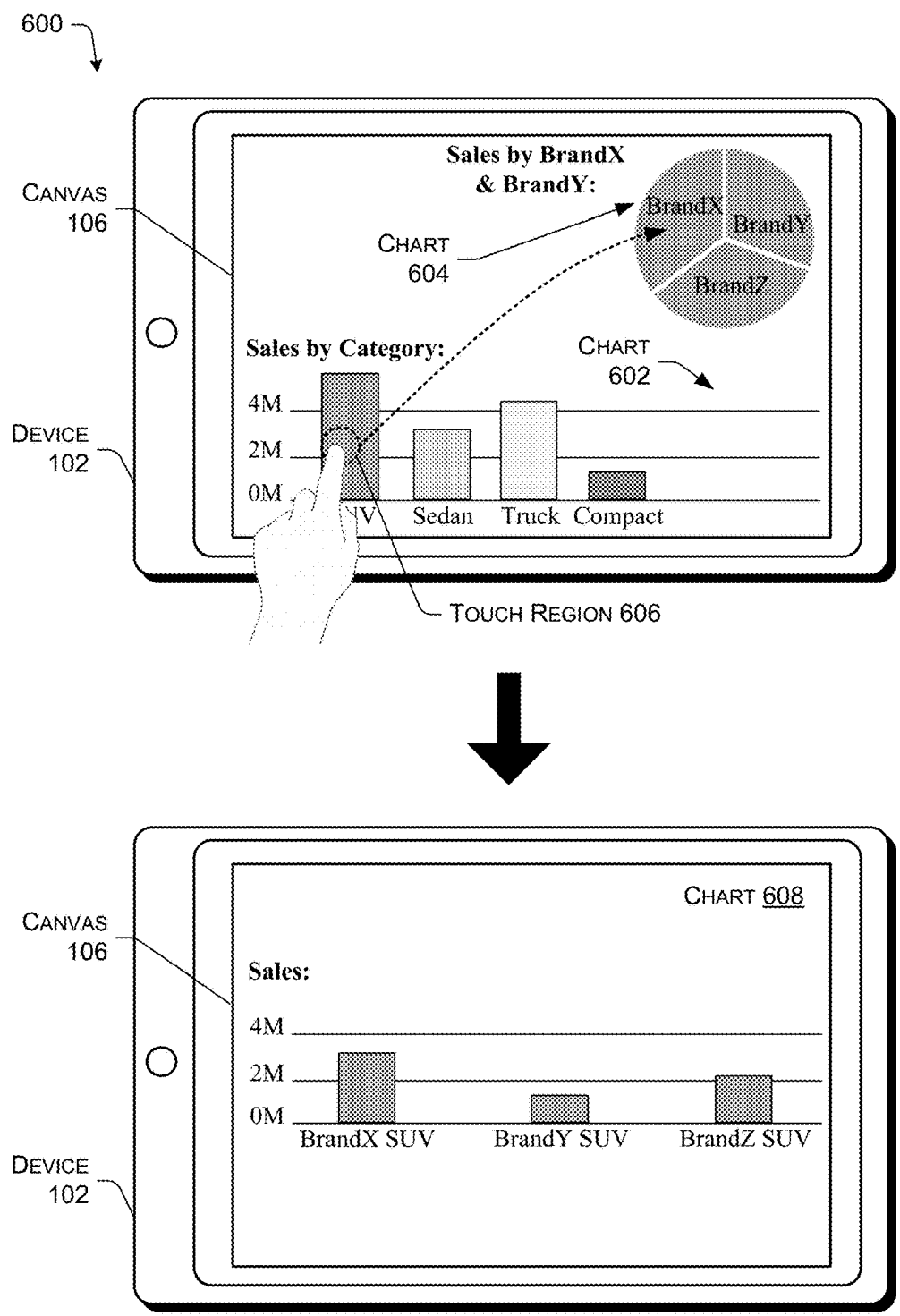
FIG. 6 depicts a first example of direct manipulation within a user interface for modifying a chart by adding a dimension item from another chart in accordance with some implementations.

FIG. 6 illustrates a framework 600 depicting an example of the direct manipulation interface component modifying a chart, where the modifications are based on direct user manipulations of representations of aspects of a data set. In this example, canvas 106 depicts two different charts, a bar chart 602 depicting sales number by category of automobile, and a pie chart 604 depicting sales by brand. Further, the bar chart 602 includes four dimension items for the category dimension, "SUV," "Sedan," "Truck" and "Compact," and the pie chart 604 includes three dimension items for the brand dimension, "BrandX," "BrandY" and "BrandZ." In this example, both charts 602, 604 refer to the same metric, sales.

Given the two charts 602, 604 within the canvas 106, a user may drag an element of one chart onto another chart. In response, the direct manipulation interface component may either modify the chart that is the target of the gesture and no longer display the other chart, or the direct manipulation interface component may leave the source chart, chart 602 unmodified and modify chart 604 according to the gesture or other input, which in this example modifies chart 604 to be chart 608. However, in general, and as noted above, in different implementations, the source chart from which the element is dragged from may remain unmodified in response to the gesture creating a new chart. In this example, a user may begin a drag-and-drop gesture by touching touch region 606 and maintaining the gesture by dragging the selected dimension item onto the other chart. Specifically, touch region 606 corresponds to dimension item "SUV" in the bar chart 602, and in response to the user dragging the SUV dimension item onto the pie chart 604, the direct manipulation interface component generates a new chart, chart 608. In this example, chart 608 modifies the original pie chart 604 by adding in an additional filtering criterion, the SUV dimension item. In other words, in response to the direct manipulation of a visual depiction of a data set, the direct manipulation interface component generates a new query that further narrows the chart that is the target of the direct manipulation.

In this example, chart 608 is generated in response to the drag-and-drop of the SUV dimension item, and filters the data set of the bar chart 602 according to the dragged dimension item. As a result, chart 608 depicts sales for BrandX, BrandY and BrandZ as originally depicted in the pie chart 604, however, the sales numbers for BrandX, BrandY and BrandZ in chart 608 correspond to SUV sales, not all category sales according to the input made by the user. This narrowing is in contrast to the original pie chart 604 which depicted sales numbers for all categories of automobile types made by either BrandX, BrandY or BrandZ. In this way, a user can further analyze a particular aspect of a data set, which in this example allows a user to further see specific sales numbers for a specific type of category for different brands of automobile. While this example shows the new chart being converted from a pie chart to a bar chart, the direct manipulation interface component, in other examples, maintains the original type of chart for the new chart that is generated.

Figure 7:
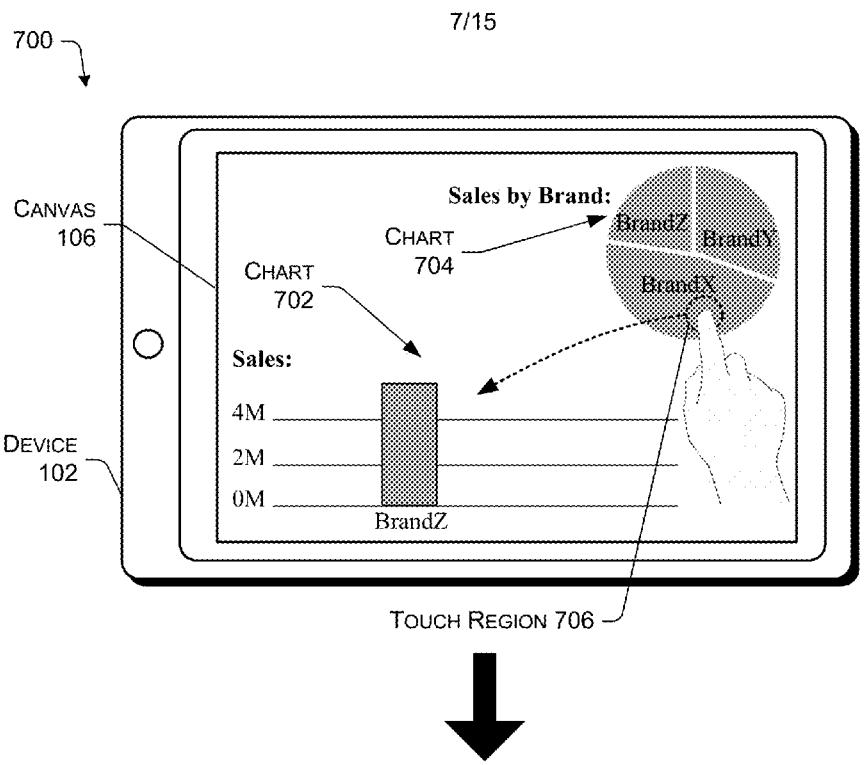
FIG. 7 depicts a second example of direct manipulation within a user interface for modifying a chart by adding a dimension item from another chart in accordance with some implementations.
Figure 7:
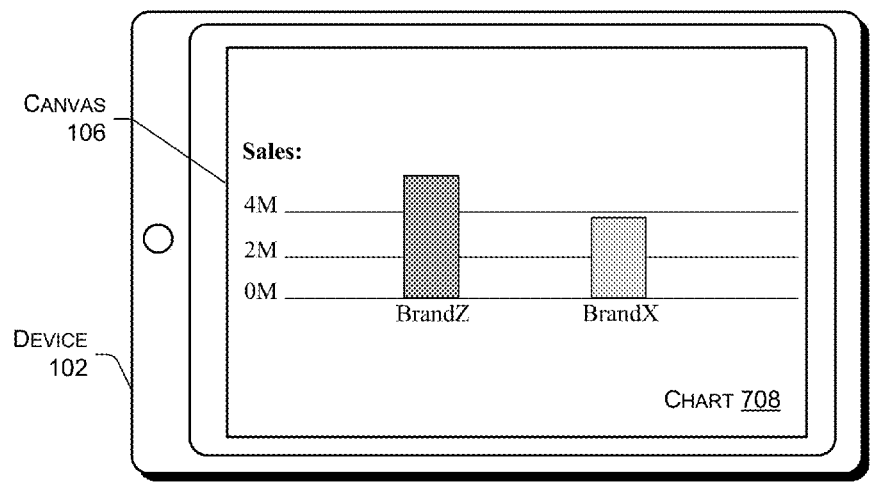

FIG. 7 illustrates a framework 700 depicting an example of the direct manipulation interface component modifying a chart, where the modifications are based on direct user manipulations of representations of aspects of a data set. In this example, canvas 106 depicts two charts, chart 702 and chart 704, where chart 702 is a representation of sales of brand BrandZ, and where chart 704 is a representation of sales of brands BrandX, BrandY and BrandZ. Further, in this example, chart 702 and chart 704 depict homogeneous data cohorts with the same Dimension:ValueSet pair.

Given these two charts, a user may begin a drag-and-drop gesture within touch region 706 and drag the BrandX dimension item corresponding to touch region 706 into a region corresponding to chart 702. After the user ends the drag-and-drop gesture within a region corresponding to chart 702, the direct manipulation interface component may, in response, update chart 702 to include BrandX and update chart 704 to no longer include BrandX while also changing chart 704 into a different type of chart based on a rule that if a chart does not include all dimension items, then the chart should not be a pie chart. In other cases, chart 702 may be updated while chart 704 remains unchanged. In this example, the updated chart, chart 708, may now include sales data for both BrandZ and BrandX, where prior to the update, sales data in the chart 702 included data for BrandZ. In short, in this example, the direct manipulation interface component, in response to the drag-and-drop gesture, removed a dimension item from one chart and updated another chart by adding the dragged dimension item.

Figure 8:
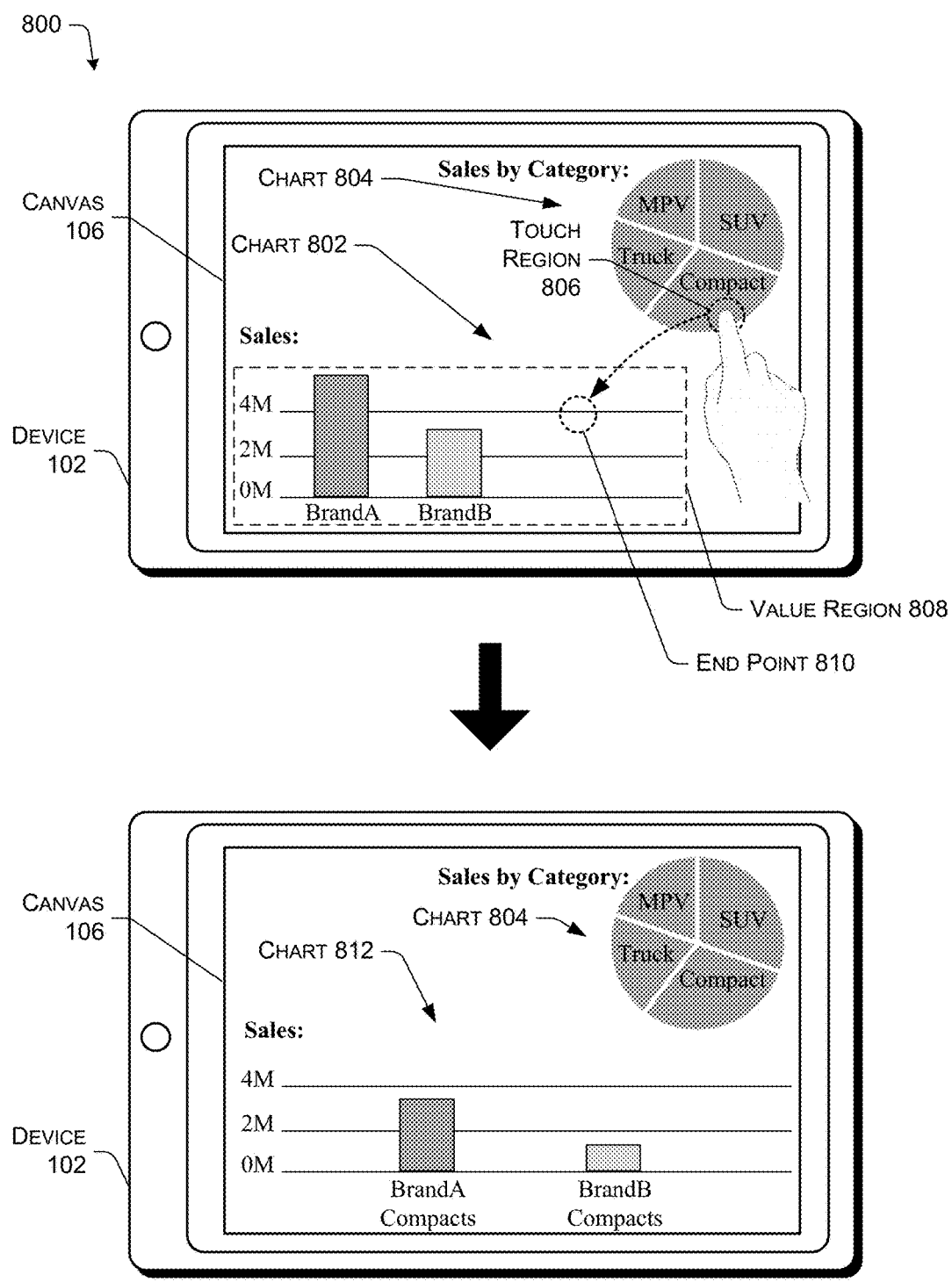
FIG. 8 depicts a third example of direct manipulation within a user interface for modifying a chart by adding a dimension item from another chart in accordance with some implementations.

FIG. 8 illustrates a framework 800 depicting an example of the direct manipulation interface component modifying a chart, where the modifications are based on direct user manipulations of representations of aspects of a data set. In this example, canvas 106 depicts two charts, chart 802 and chart 804, where chart 802 is a representation of sales of brands BrandA, and BrandB, and where chart 804 is a representation of sales by category, including categories for "MPV," "Truck," "Compact" and "SUV." Further, in this example, chart 802 and chart 804 depict heterogeneous data cohorts with different Dimension:ValueSet pairs. Specifically, chart 802 includes a dimension for brands and chart 804 does not include a dimension for brands, while chart 804 includes a dimension for category and chart 802 does not include a dimension for category.

Given these two charts 802, 804, a user may begin a drag-and-drop gesture within touch region 806 and drag the "Compact" dimension item into value region 810 corresponding to chart 802. In this example, a value region may be specified to be a region of the user interface that encompasses depictions of the measured chart elements. After the user ends the drag-and-drop gesture within value region 808 of chart 802, such as end point 810, the direct manipulation interface component may, in response, update chart 802 and leave chart 804 unchanged and visible in the canvas. In this case, the update to chart 802 is depicted with chart 812, which includes columns corresponding to sales for compact automobiles of BrandA and sales for compact automobiles of BrandB, where chart 802 simply had sales for automobiles of BrandA and sales for automobiles of BrandB. In other words, the direct manipulation interface component, in response to the addition of a specific dimension item of a category into the value region 808, modifies the data cohorts in the chart 802 to filter the existing dimension items (BrandA and BrandB) according to the compact category dimension item. In short, in this example, the direct manipulation interface component, in response to the drag-and-drop gesture, used a dimension item from one chart and updated another chart by adding the dragged dimension item as a filtering criterion.

Figure 9:
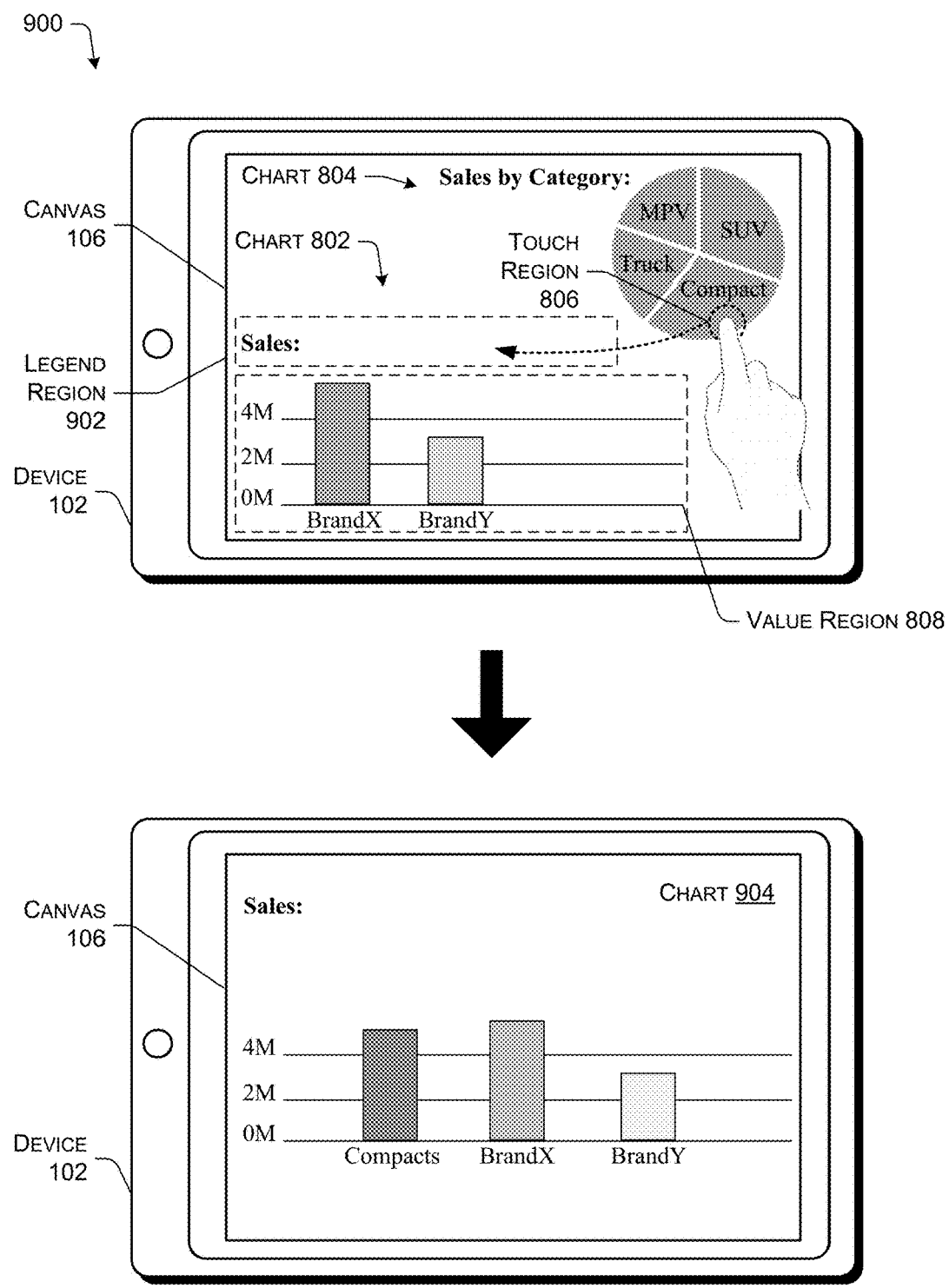
FIG. 9 depicts a fourth example of direct manipulation within a user interface for modifying a chart by adding a dimension item from another chart in accordance with some implementations.

FIG. 9 illustrates a framework 900 depicting an example of the direct manipulation interface component modifying a chart, where the modifications are based on direct user manipulations of representations of aspects of a data set. In this example, in contrast to the example discussed with respect to FIG. 8, a different type of update to chart 802 may be performed by the direct manipulation interface component in response to the drag-and-drop gesture.

In this example, instead of a drag-and-drop gesture ending within value region 808 and resulting in chart 812 as in FIG. 8, a drag-and-drop gesture beginning within touch region 806 ends within legend region 902. Touch region 806 corresponds to an automobile category dimension item of "Compact." In this example, in response to the drag-and-drop gesture, the direct manipulation interface component generates an updated chart, chart 904. Updated chart 904 now includes three columns of sales data: one column for sales data for BrandX (as before), one column for sales data for BrandY (as before), and a column for sales data for all compacts (an added column).

In short, in response to the addition of a dimension item into the legend region of a chart, where the added dimension item was not already included within the chart, the direct manipulation interface component may generate an updated chart that includes heterogeneous data cohorts. In other words, chart 904 allows a user to compare sales for dimension item "Compact," which may include sales of all brands of compact automobiles, against sales of automobiles of BrandX and sales of automobiles of BrandY.

Figure 10:
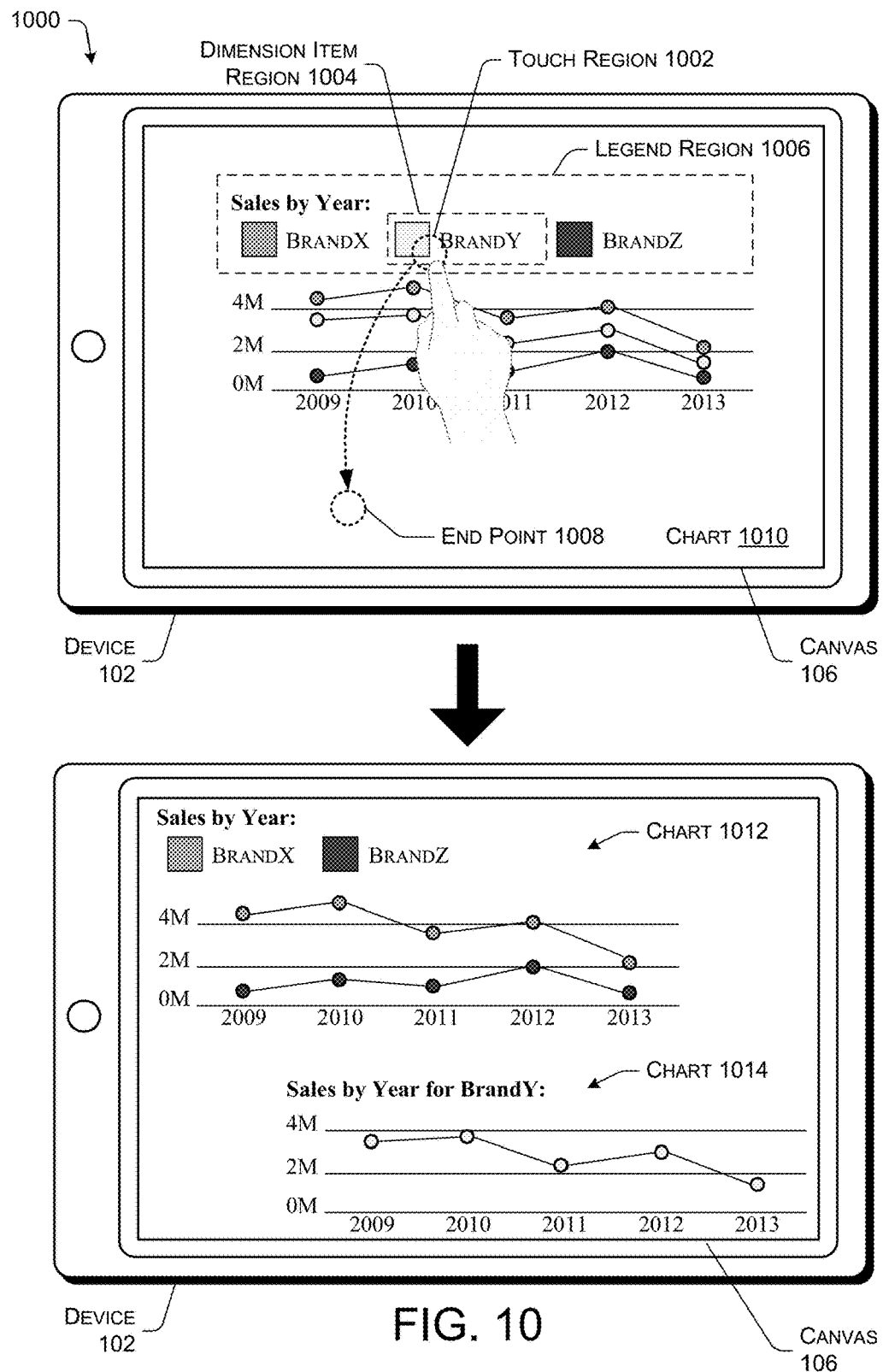
FIG. 10 depicts a fifth example of direct manipulation within a user interface for modifying a chart by adding a dimension item from another chart in accordance with some implementations.

FIG. 10 illustrates a framework 1000 depicting an example of the direct manipulation interface component modifying a chart, where the modifications are based on direct user manipulations of representations of aspects of a data set. In this example, a user may modify a chart based on dragging and dropping a dimension item within a legend region from the legend region to another, empty, part of the canvas.

In this example, a user may touch down and begin dragging within touch region 1002, which may be within dimension item region 1004 of legend region 1006. In response to ending the drag-and-drop gesture within an empty region of the canvas 106 at end point 1008, the direct manipulation interface component may remove the series corresponding to the selected dimension item, BrandY from chart 1010 and generate an updated chart, chart 1012, and also generate a new chart 1014. In this example, updated chart 1012 would no longer include BrandY and new chart 1014 would simply include a series for BrandY. In other implementations, the direct manipulation interface component may generate the chart 1012 without generating the chart 1014 or the direct manipulation interface component may generate the chart 1014 without generating the chart 1012.

Figure 11:
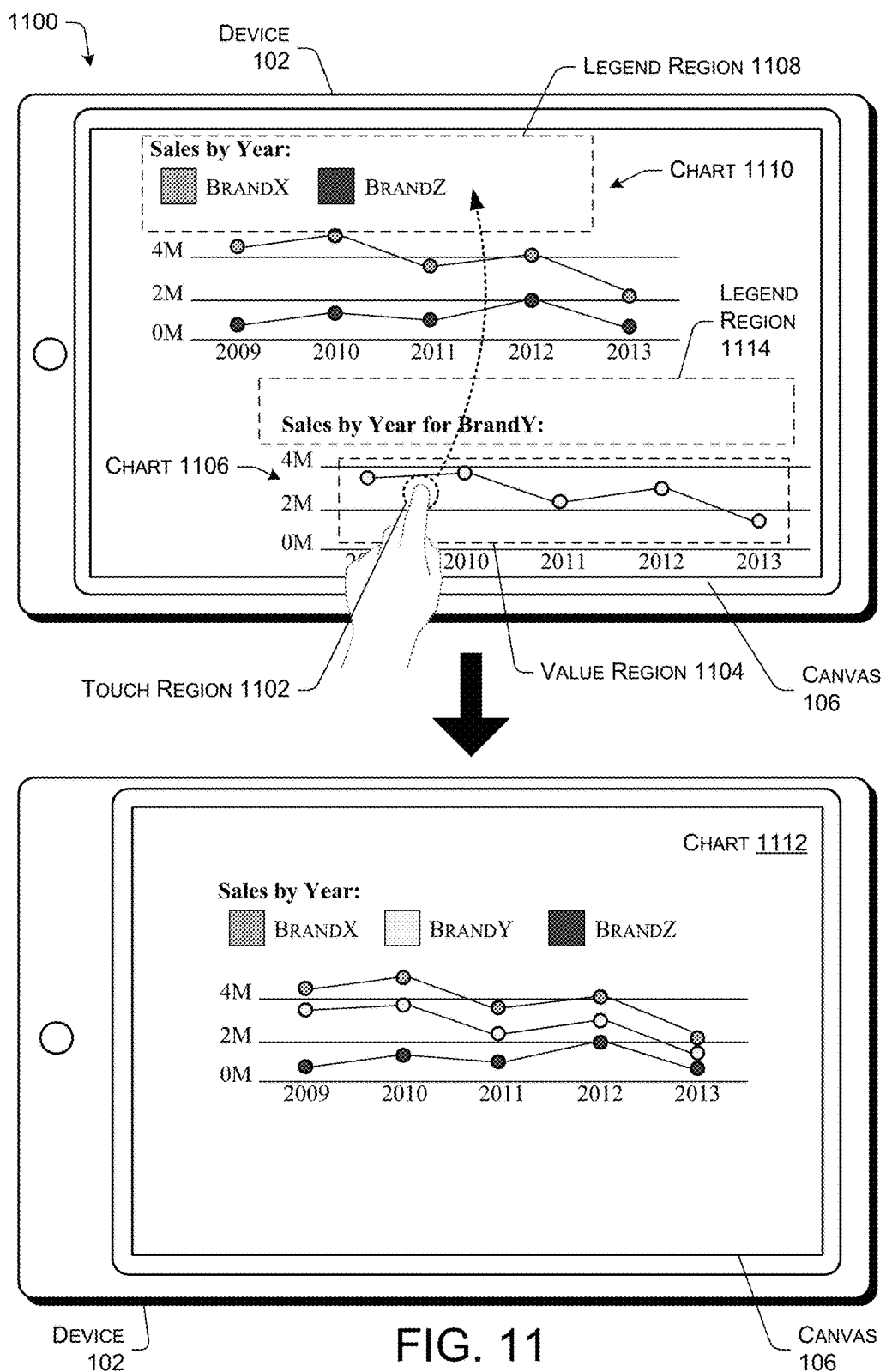
FIG. 11 depicts a sixth example of direct manipulation within a user interface for modifying a chart by adding a dimension item from another chart in accordance with some implementations.

FIG. 11 illustrates a framework 1100 depicting an example of the direct manipulation interface component modifying a chart, where the modifications are based on direct user manipulations of representations of aspects of a data set. In this example, in contrast to the example in FIG. 10 where a series is removed from a chart, a user combines a series from one chart into another chart to leave a single remaining chart. In this example, a single chart remains because the chart from which the series is removed included one series.

In this example, a user may touch down and begin dragging within touch region 1102, which may be within value region 1104 of chart 1106. In response to ending the drag-and-drop gesture within legend region 1108 of chart 1110, the direct manipulation interface component may remove chart 1106 from canvas 106 and generate an updated chart, chart 1112. In this example, updated chart 1112 would be modified to include sales data for BrandY in addition to maintaining the sales data for BrandX and BrandZ. Further, another way to produce the same effect as in this example would be for a user to drag BrandY from legend region 1114 of chart 1106 onto chart 1110.

Figure 12:
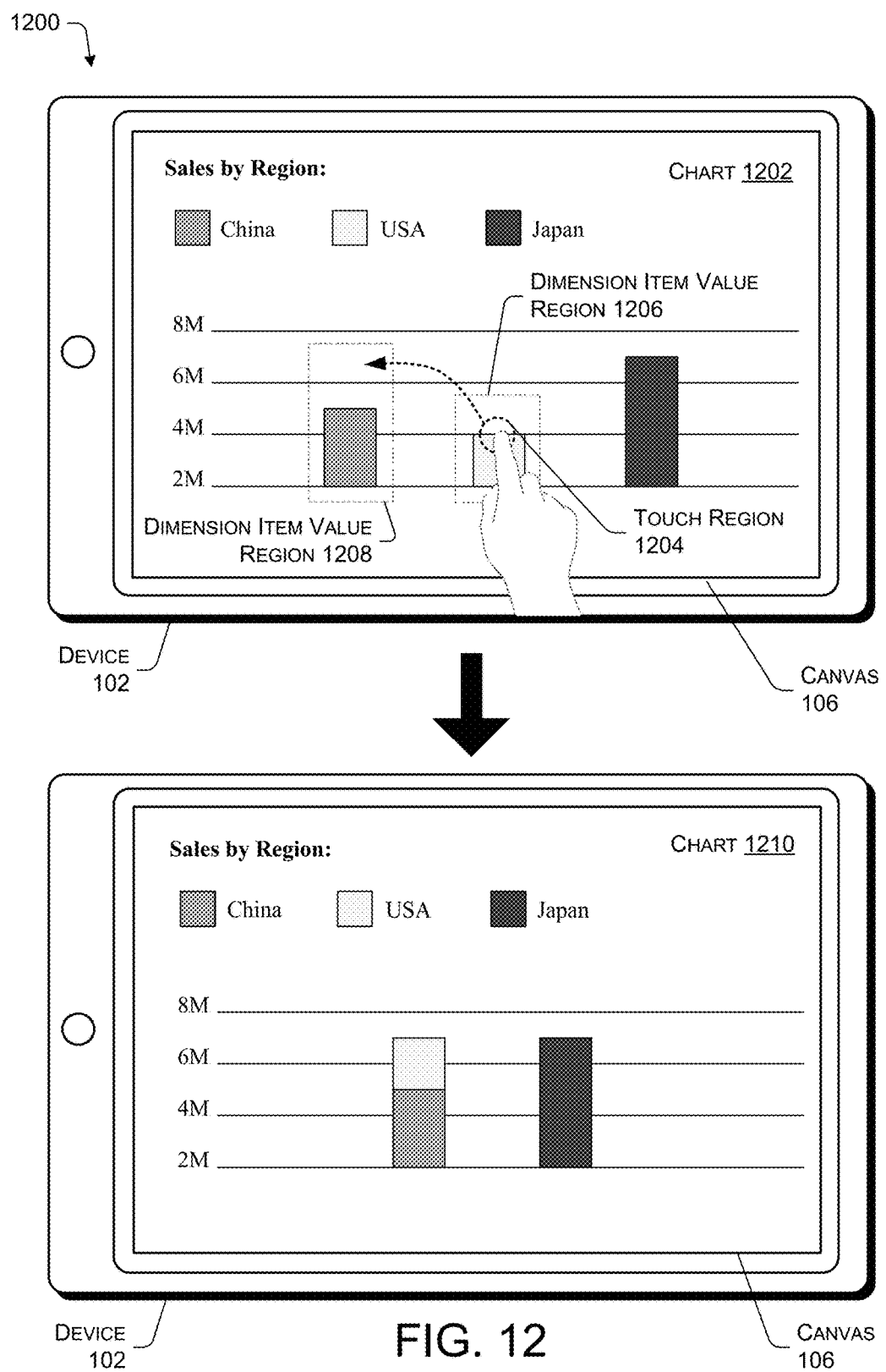
FIG. 12 depicts a first example of direct manipulation within a user interface for modifying a chart by rearranging elements within the chart in accordance with some implementations.

FIG. 12 illustrates a framework 1200 depicting an example of the direct manipulation interface component modifying a chart, where the modifications are based on direct user manipulations of representations of aspects of a data set. In this example, an existing chart, chart 1202, depicts sales by regions. Chart 1202 depicts three columns, one column for sales in China, one column for sales in the USA, and one column for sales in Japan.

In this example, a user may touch down and begin dragging within touch region 1204, which may be within dimension item value region 1206 of chart 1202. In response to ending the drag-and-drop gesture within dimension item value region 1208, the direct manipulation interface component may combine the depiction of the column for sales in the USA with the depiction of the column for sales in China. In this example, updated chart 1210 would be modified to have two columns instead of three columns, where one of the columns is created from the combination of columns based on the drag-and-drop gesture. In this way, in response to a gesture, the direct manipulation interface component allows a user to compare dynamically created subsets of a data set where the data set is already depicted in a chart.

In another example, instead of a user combining different dimension items depicted within a single chart, a user may select a different dimension item or items from a separate chart or charts (not depicted), and drag the selected element from the other chart onto one of the dimension items of chart 1202. In this way, a depicted dimension item in chart 1210 may be modified to be depicted as a combination of dimension items.

Figure 13:
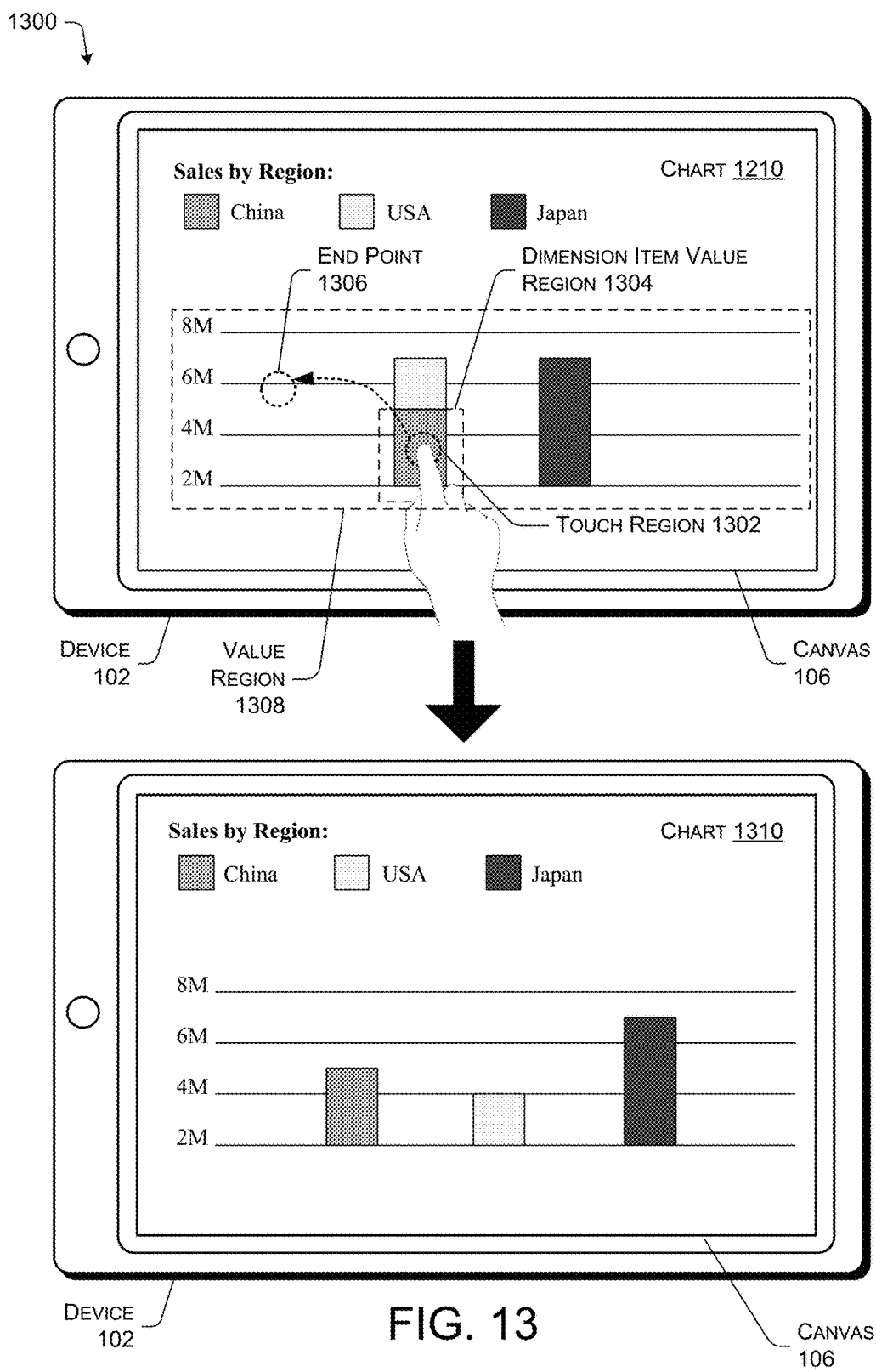
FIG. 13 depicts a second example of direct manipulation within a user interface for modifying a chart by rearranging elements within the chart in accordance with some implementations.

FIG. 13 illustrates a framework 1300 depicting an example of the direct manipulation interface component modifying a chart, where the modifications are based on direct user manipulations of representations of aspects of a data set. In this example, an existing chart, chart 1210 created above with respect to FIG. 12, depicts sales by regions. Chart 1210 depicts two columns, where one of the columns is a depiction of a combination of sales for China and the USA, and where the other column depicts sales in Japan.

In this example, in contrast to the gesture described in FIG. 12 that generated a combined column, a user may touch down and begin dragging within touch region 1302, which may be within dimension item value region 1304 of chart 1210. In response to ending the drag-and-drop gesture at end point 1306, which may be within value region 1308, the direct manipulation interface component may separate or extract the portion of the column representing sales in China from the combined column. In this example, updated chart 1310 would be modified to have three columns instead of two columns, where one of the columns is created from the extraction of the combined columns, and where the extraction and creation of the new column is based on the drag-and-drop gesture. In this way, in response to a gesture, the direct manipulation interface component allows a user to dynamically change the representation of a data set, allowing for a different type of analysis.

Figure 14:
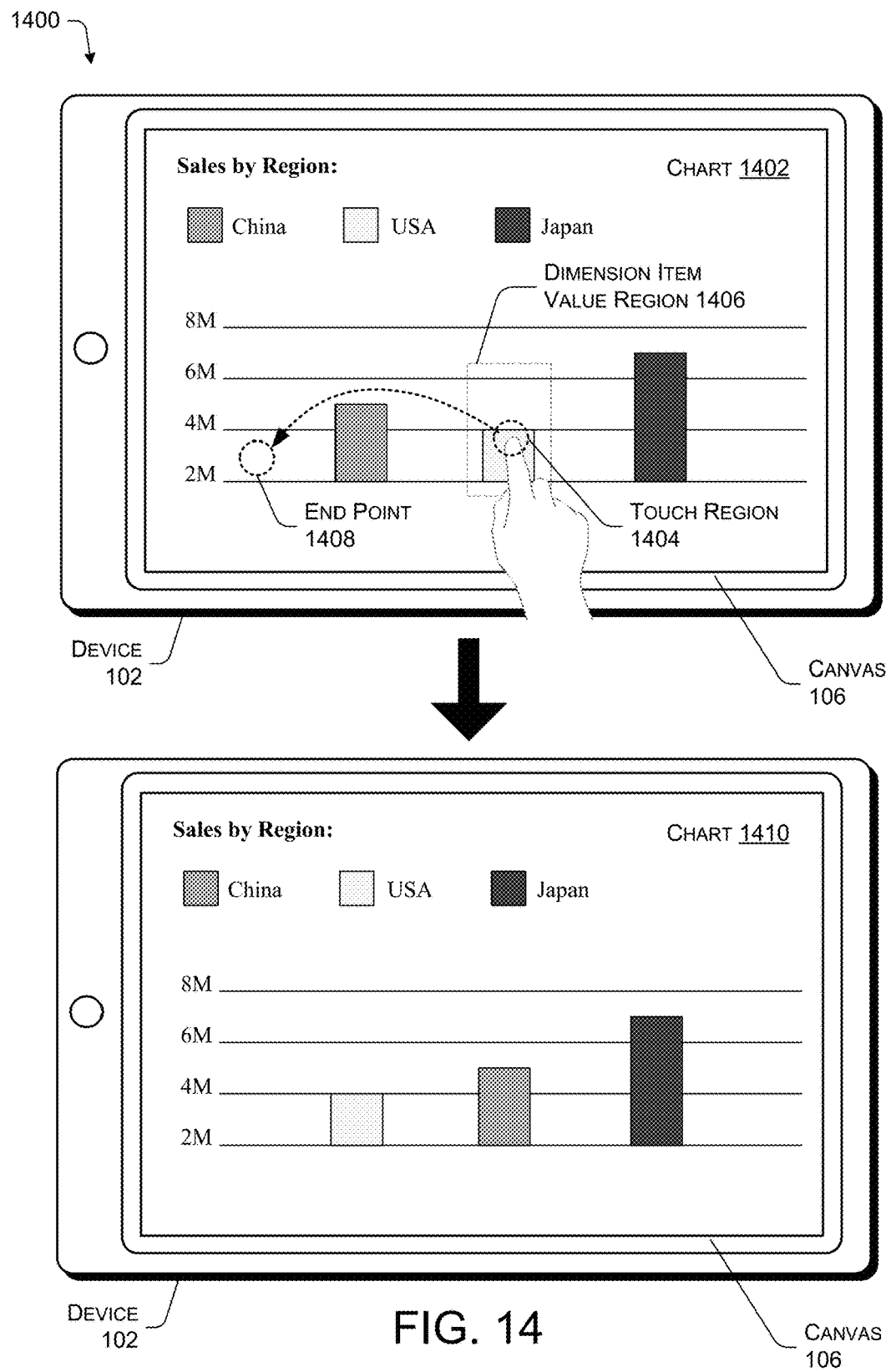
FIG. 14 depicts a third example of direct manipulation within a user interface for modifying a chart by rearranging elements within the chart in accordance with some implementations.

FIG. 14 illustrates a framework 1400 depicting an example of the direct manipulation interface component modifying a chart, where the modifications are based on direct user manipulations of representations of aspects of a data set. In this example, an existing chart, chart 1402 is modified to rearrange existing elements of the chart. Chart 1402 depicts three columns, which are, from left to right, sales in China, sales in the USA, and sales in Japan.

In this example, a user may touch down and begin dragging within touch region 1404, which may be within dimension item value region 1406. In response to ending the drag-and-drop gesture at end point 1408, which in this example is to the left of the column depiction of sales in China, the direct manipulation interface component may update chart 1402 by moving the depiction of the column for sales in the USA from the right of the column depicting sales in China to the left of the column depicting sales in China. In this example, chart 1410 depicts the new arrangement in response to the gesture. In this way, in response to a gesture, the direct manipulation interface component allows a user to dynamically change the representation of a data set.

Figure 15:
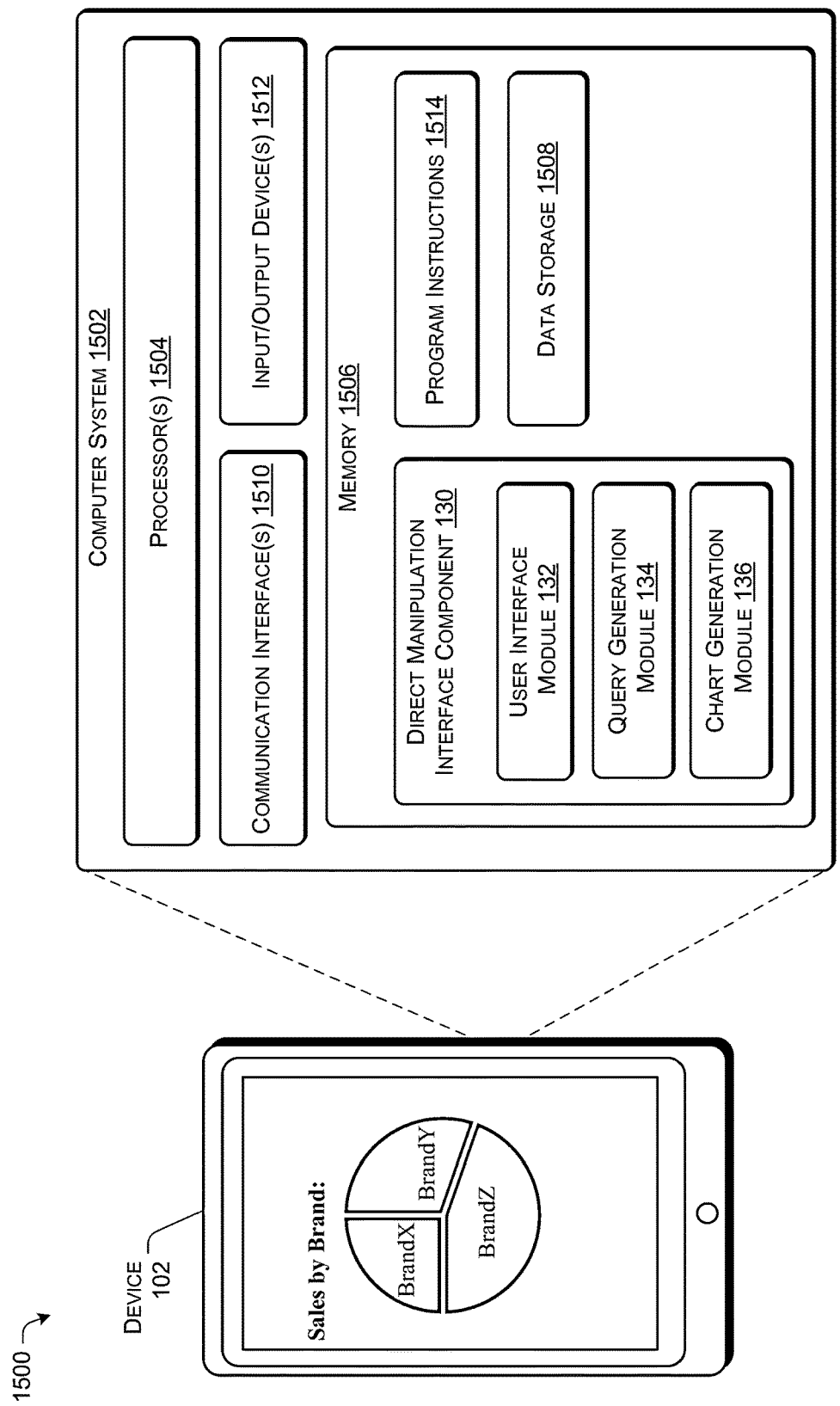
FIG. 15 illustrates a computer system that may be configured to implement a direct manipulation interface component according to some implementations.

FIG. 15 further illustrates a framework 1500 depicting a computer system 1502. Computer system 1502 may be implemented in different devices, such as device 102 depicted in FIG. 1. Generally, computer system 1502 may be implemented in any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in any type of computing or electronic device.

In one implementation, computer system 1502 includes one or more processors 1504 coupled to memory 1506. The processor(s) 1504 can be a single processing unit or a number of processing units, all of which can include single or multiple computing units or multiple cores. The processor(s) 1504 can be implemented as one or more microprocessors, microcomputers, microcontrollers, digital signal processors, central processing units, state machines, logic circuitries, and/or any devices that manipulate signals based on operational instructions. As one non-limiting example, the processor(s) 1504 may be one or more hardware processors and/or logic circuits of any suitable type specifically programmed or configured to execute the algorithms and processes described herein. Among other capabilities, the processor(s) 1504 can be configured to fetch and execute computer-readable instructions stored in the memory 1506 or other computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

By contrast, communication media may embody computer-readable instructions, data structures, program modules, or other data in a modulated data signal, such as a carrier wave, or other transmission mechanism. As defined herein, computer storage media does not include communication media.

The memory 1506, including data storage 1508, is an example of computer storage media. Further, computer system 1502 may include one or more communication interfaces 1510 that may facilitate communications between computing devices. In particular, the communication interfaces 1510 may include one or more wired network communication interfaces, one or more wireless communication interfaces, or both, to facilitate communication via one or more networks represented by a network. The network may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, computer system 1502 may include input/output devices 1512. The input/output devices 1512 may include a keyboard, a pointer device, (e.g. a mouse or a stylus), a touch screen, one or more image capture devices (e.g. one or more cameras), one or more microphones, a display, speakers, and so forth.

In some implementations, the invention may be implemented using a single instance of a computer system, while in other implementations, the invention may be implemented on multiple such systems, or multiple nodes making up a computer system may be configured to host different portions or instances of implementations. For example, in one implementation some elements may be implemented via one or more nodes of the computer system that are distinct from those nodes implementing other elements.

The memory 1506 within the computer system 1502 may include program instructions 1514 configured to implement each of the implementations described herein. In one implementation, the program instructions may include software elements of implementations of the modules discussed herein. The data storage within the computer system may include data that may be used in other implementations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
   at least one processor; and
   a memory coupled to the at least one processor and storing instructions that, when executed by the at least one processor, perform a method, comprising:
      detecting input that selects and moves one or more visual representations of a data set depicted within a first area of a user interface, the one or more visual representations representing one or more elements of a data set;
      determining one or more query parameters, based, at least in part, on the detected input and on an ending point of the movement of the one or more visual representations, the ending point in a second area of the user interface;
      querying the data set using the determined one or more query parameters;

receiving a query response that includes results of the querying, wherein the results include at least one element of the one or more elements of the data set;
automatically determining a chart type in which to display the results, wherein the chart type is based, at least in part, on:
one or more selection criteria; and
the query response; and
generating a chart that displays the results using the determined chart type.

2. The system of claim 1, further comprising instructions for determining a touch region of the input within the user interface and an end point of the input within the user interface.

3. The system of claim 1, wherein the input is one or more of:
a direct manipulation of a dimension of the data set;
a direct manipulation of a dimension item of the data set; or
a direct manipulation of a metric of the data set.

4. The system of claim 1, wherein the one or more selection criteria include user preferences or default chart types.

5. A method, comprising:
detecting input that selects a visual element of a visual representation associated with a chart in a user interface, the visual element corresponding to a quantity of a dimension of a data set with the visual representation;
detecting that the input ends within a chart displayed on the user interface; and
in response to detecting that the input ends within the chart displayed on the user interface:
filtering the data set according to the dimension associated with the selected visual element; and
updating the chart using the filtered data set.

6. The method of claim 5, wherein filtering the data set comprises:
querying a database such that query parameters include the dimension and a default metric; and
receiving a subset of the data set.

7. The method of claim 5, wherein updating the chart comprises:
determining a default metric that corresponds to the data set; and
generating a visual element of the data set to correspond to the default metric.

8. The method of claim 5, wherein:
the visual element is a first visual element, the input is a first input, and the method further comprises:
detecting a second input that selects a second visual element of the user interface, the second visual element corresponding to a metric of the data set;
detecting that the second input ends within the chart displayed on the user interface; and
in response to detecting that the second input ends within the chart displayed on the user interface, updating the chart with the second visual element.

9. The method of claim 5, wherein the input includes a touch input.

10. The method of claim 5, further comprising generating a new visual element within the chart displayed on the user interface that corresponds to the dimension.

11. The method of claim 10, further comprising:
detecting an input selecting the new visual element;
detecting a drag operation of the new visual element ending over an existing visual element within the region; and
in response to detecting that the drag operation of the new visual element ended over the existing visual element, updating the visual representation of the data set to produce an additional visual element of the user interface, the additional visual element including a combination of the new visual element and the existing visual element.

12. The method of claim 10, further comprising:
detecting an input selecting the new visual element;
detecting a drag operation of the new visual element ending outside of the region; and
in response to detecting that the drag operation of the new visual element ended outside of the region, generating an updated visual representation of the data set such that the updated chart is not filtered according to an additional dimension of the data set corresponding to the new visual element.

13. The method of claim 10, further comprising:
detecting an input selecting the new visual element;
detecting a flick operation of the new visual element; and
in response to detecting the flick operation of the new visual element, generating an updated visual representation of the data set such that the updated chart is not filtered according to the dimension corresponding to the new visual element.

14. The method of claim 5, further comprising modifying an existing visual element within the chart displayed on the user interface that corresponds to the dimension in response to detecting that the input ends within the chart.

15. The method of claim 5, wherein visual elements of the user interface correspond to depictions of one or more of:
a dimension of the data set;
a dimension item of the data set; or
a metric of the data set.

16. The method of claim 5, further comprising:
detecting a first input selecting a first visual element of the visual representation of the data set within a threshold amount of time of detecting a second input selecting a second visual element of the visual representation of the data set;
detecting a beginning of a drag-and-drop operation of the first visual element and the second visual element;
detecting that the drag-and-drop operation of the first visual element and the second visual element ends outside of the chart displayed on the user interface; and
generating a new visual representation of the data set based, at least in part, on filtering the data set according to a first element of the data set that corresponds to the first visual element and a second element of the data set that corresponds to the second visual element.

17. A system, comprising:
at least one processor; and
a memory coupled to the at least one processor and storing instructions that, when executed by the at least one processor, perform a method, comprising:
detecting an input that selects a visual representation of an aspect of a data set, the visual representation being included in a first region of a chart displayed within a user interface;
detecting that the input ends within a second region of the chart that is different than the first region of the chart;
determining one or more modifications for the chart based, at least in part, on:
the selected visual representation of the aspect of the data set;
the input ending within the second region of the chart; and the aspect of the data set that corresponds to the visual representation; and modifying one or more visual elements of the chart based, at least in part, on the determined one or more modifications.

18. The system of claim 17, wherein the visual representation of the aspect of the data set includes a first column of the chart, the region of the chart includes a second column of the chart, and the memory further stores instructions for combining the first column and the second column into a single column within the chart.

19. The system of claim 17, wherein the chart includes one or more columns, and the memory further stores instructions for separating a column of the one or more columns within the chart into a first column and a second column within the chart.

20. The system of claim 17, wherein modifying the one or more visual elements of the chart includes rearranging an order of one or more columns within the chart.

\* \* \* \* \*